(12) United States Patent
Hirai et al.

(10) Patent No.: US 10,510,322 B2
(45) Date of Patent: Dec. 17, 2019

(54) INPUT DISPLAY DEVICE, INPUT DISPLAY METHOD, AND COMPUTER-READABLE MEDIUM

(71) Applicant: MITSUBISHI ELECTRIC CORPORATION, Tokyo (JP)

(72) Inventors: Masato Hirai, Tokyo (JP); Akiko Imaishi, Tokyo (JP); Yoshimichi Umeki, Tokyo (JP); Tsutomu Matsubara, Tokyo (JP); Naoki Tsuru, Tokyo (JP); Takahiro Yamaguchi, Tokyo (JP); Takanori Hikima, Tokyo (JP); Takashi Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/540,656

(22) PCT Filed: May 28, 2015

(86) PCT No.: PCT/JP2015/065431
§ 371 (c)(1),
(2) Date: Jun. 29, 2017

(87) PCT Pub. No.: WO2016/189735
PCT Pub. Date: Dec. 1, 2016

(65) Prior Publication Data
US 2018/0005604 A1  Jan. 4, 2018

(51) Int. Cl.
*G09G 5/30* (2006.01)
*G06F 3/0488* (2013.01)
(Continued)

(52) U.S. Cl.
CPC ........... *G09G 5/30* (2013.01); *G06F 3/04883* (2013.01); *G06T 11/60* (2013.01); *G09G 5/24* (2013.01);
(Continued)

(58) Field of Classification Search
None
See application file for complete search history.

(56) References Cited

U.S. PATENT DOCUMENTS

| 5,233,438 A | 8/1993 | Funahashi et al. |
| 5,574,239 A | 11/1996 | Kang et al. |

(Continued)

FOREIGN PATENT DOCUMENTS

| JP | 2-47763 A | 2/1990 |
| JP | H05-127810 A | 5/1993 |

(Continued)

OTHER PUBLICATIONS

Author: PhotoAdvanced, Title: How to Put Text on Path (Tips and Tricks)—Inkscape Tutorial, Date: Feb. 28, 2013, Source: https://www.youtube.com/watch?v=VwOYO9cAows(Year: 2013).*

(Continued)

*Primary Examiner* — Jwalant Amin
(74) *Attorney, Agent, or Firm* — Birch, Stewart, Kolasch & Birch, LLP

(57) ABSTRACT

An input display device includes: a processor to execute a program; and a memory to store the program which, when executed by the processor, results in performance of steps including: receiving an input of a track by a receiving unit; generating a track image showing the track; acquiring a character string; and displaying the character string acquired in the acquiring to be superimposed on the track image.

(Continued)

When the character string is acquired in the acquiring before the track image is generated, the displaying the character string is stood by.

12 Claims, 18 Drawing Sheets

(51) Int. Cl.
*G06T 11/60* (2006.01)
*G09G 5/32* (2006.01)
*G10L 15/00* (2013.01)
*G10L 15/26* (2006.01)
*G09G 5/40* (2006.01)
*G09G 5/24* (2006.01)
*G06T 11/00* (2006.01)
*G06T 11/20* (2006.01)
*G10L 15/08* (2006.01)
*G09G 5/26* (2006.01)

(52) U.S. Cl.
CPC ............... *G09G 5/32* (2013.01); *G09G 5/40* (2013.01); *G10L 15/005* (2013.01); *G10L 15/265* (2013.01); *G06T 11/001* (2013.01); *G06T 11/203* (2013.01); *G06T 2200/24* (2013.01); *G09G 5/26* (2013.01); *G09G 2354/00* (2013.01); *G10L 15/08* (2013.01)

(56) References Cited

U.S. PATENT DOCUMENTS

| | | | |
|---|---|---|---|
| 2004/0119762 | A1 | 6/2004 | Denoue et al. |
| 2010/0156919 | A1 | 6/2010 | Bala et al. |
| 2011/0298807 | A1 | 12/2011 | Kim |
| 2012/0098835 | A1 | 4/2012 | Sorihashi |
| 2014/0221049 | A1* | 8/2014 | Kim .................. H04M 1/56 |
| | | | 455/566 |

FOREIGN PATENT DOCUMENTS

| | | | |
|---|---|---|---|
| JP | 7-64998 | A | 3/1995 |
| JP | 8-30665 | A | 2/1996 |
| JP | H08-305799 | A | 11/1996 |
| JP | 10-3516 | A | 1/1998 |
| JP | 10-124033 | A | 5/1998 |
| JP | 2002-251280 | A | 9/2002 |
| JP | 2004-102632 | A | 4/2004 |
| JP | 2004-139411 | A | 5/2004 |
| JP | 2004-206701 | A | 7/2004 |
| JP | 2007-133885 | A | 5/2007 |
| JP | 2012-73857 | A | 4/2012 |
| JP | 2012-88969 | A | 5/2012 |
| JP | 5458161 B1 * | 4/2014 | ......... G06F 3/04883 |
| KP | 10-2011-0133787 | A | 12/2011 |
| KP | 10-2014-0074725 | A | 6/2014 |

OTHER PUBLICATIONS

Author: Julie Felton, Title: Working with Type on a Path in Illustrator, Date: Apr. 23, 2014, Source: https://design.tutsplus.com/tutorials/working-with-type-on-a-path-in-illustrator--cms-20711 (Year: 2014).*
Office Action dated Jun. 19, 2018 in corresponding Japanese Patent Application No. 2017-207523 with a machine generated translation.
Extended European Search Report dated Oct. 19, 2018 in corresponding European Application No. 15893369.7.
Office Action dated Dec. 7, 2018 in corresponding Korean Patent Application No. 2017-7027349.
Refusal Decision dated May 31, 2019 in corresponding Korean Application No. 10-2017-7027349.
Office Action dated Jul. 15, 2019 in corresponding Korean Patent Application No. 2017-7027349.
Office Action dated Jul. 30, 2019 in corresponding Japanese Patent Application No. 2018-247063.
Office Action dated Sep. 30, 2019 in corresponding Korean Patent Application No. 10-2019-7023932.

* cited by examiner

| Character Type | Character Size | Character Height | Character Width |
|---|---|---|---|
| A | 5 | 2.5mm | 2.5mm |
| | 10 | 5mm | 5mm |
| | 15 | 7.5mm | 7.5mm |
| | 20 | 10mm | 10mm |
| B | 5 | 2mm | 1.25mm |
| | 10 | 4mm | 2.5mm |
| | 15 | 6mm | 3.75mm |
| | 20 | 8mm | 5mm |
| C | ... | ... | ... |
| | ... | ... | ... |
| | ... | ... | ... |
| | ... | ... | ... |

【When Track Image Is Generated Previously】

Display Track Image

Utter

Display Character String Showing Voice Recognition Result on Track Image

Delete Track Image

【When Character String Showing Voice Recognition Result Is Generated Previously】

Utter

Display Character String Showing Voice Recognition Result on Track Image

Delete Track Image

Drawing Track with High Writing Pressure

Drawing Track with Low Writing Pressure

Drawing Track at High Speed

Drawing Track at Low Speed

- Drawing Track While Changing Speed from Low to High
- Drawing Track While Changing Writing Pressure from Low to High

- Drawing Track While Changing Speed
- Drawing Track While Changing Writing Pressure 【In Japanese】 【In English】

Press and Hold

Switching Operation

Picture Drawing Display Mode
User Can Draw Picture by Moving Fingertip or Pen

INPUT DISPLAY DEVICE, INPUT DISPLAY METHOD, AND COMPUTER-READABLE MEDIUM

TECHNICAL FIELD

The present invention relates to an input display device and an input display method for displaying a character string showing a voice recognition result on a display.

BACKGROUND ART

The Patent literature 1 listed below discloses an input display device that displays a character string showing a result of voice recognition on a display.

In this input display device, when a user performs an operation of drawing a line using a pen type input device, a start point and an end point of the line is detected, and a straight line connecting between the start point and the end point is drawn on the display.

After that, when the user inputs a voice using a microphone, the input display device performs a recognition process on the voice, and displays a character string showing a result of the recognition of the voice in such a way that the character string is arranged along the drawn straight line.

CITATION LIST

Patent Literature

Patent Literature 1: Japanese Unexamined Patent Application Publication No. 2012-88969 (FIGS. 2, 3 and 6)

SUMMARY OF INVENTION

Technical Problem

Because the conventional input display device is configured as above, when a user performs an operation of drawing a line using a pen type input unit, a straight line connecting between a start point and an end point of the line is drawn on the display. Therefore, before the user inputs a voice using a microphone, the position at which a character string showing a result of the recognition of the voice is to be displayed can be grasped in advance. However, there is a problem that, because a line drawn on the display is limited to a straight line connecting between a start point and an end point, it is not possible to draw a character string showing a result of recognition of a voice in a layout flexibly set by the user.

The present invention is made in order to solve the above-mentioned problem, and it is therefore an object of the present invention to provide an input display device and an input display method capable of displaying a character string showing a result of recognition of a voice in a layout flexibly set by a user.

Solution to Problem

According to the present invention, an input display device includes: a processor to execute a program; and a memory to store the program which, when executed by the processor, results in performance of steps including: receiving an input of a track by a receiving unit; generating a track image showing the track; acquiring a character string; and displaying the character string acquired in the acquiring to be superimposed on the track image. When the character string is acquired in the acquiring before the track image is generated, the displaying the character string is stood by.

Advantageous Effects of Invention

Because the input display device according to the present invention is configured in such a way that an input display device includes: an input display device includes: a processor to execute a program; and a memory to store the program which, when executed by the processor, results in performance of steps including: receiving an input of a track by a receiving unit; generating a track image showing the track; acquiring a character string; and displaying the character string acquired in the acquiring to be superimposed on the track image. When the character string is acquired in the acquiring before the track image is generated, the displaying the character string is stood by, there is provided an effect of being able to display the character string showing the voice recognition result in accordance with a layout flexibly set by a user.

DESCRIPTION OF EMBODIMENTS

Hereafter, in order to explain this invention in more detail, some embodiments of the present invention will be described with reference to the accompanying drawings.

Embodiment 1

Figure 1:
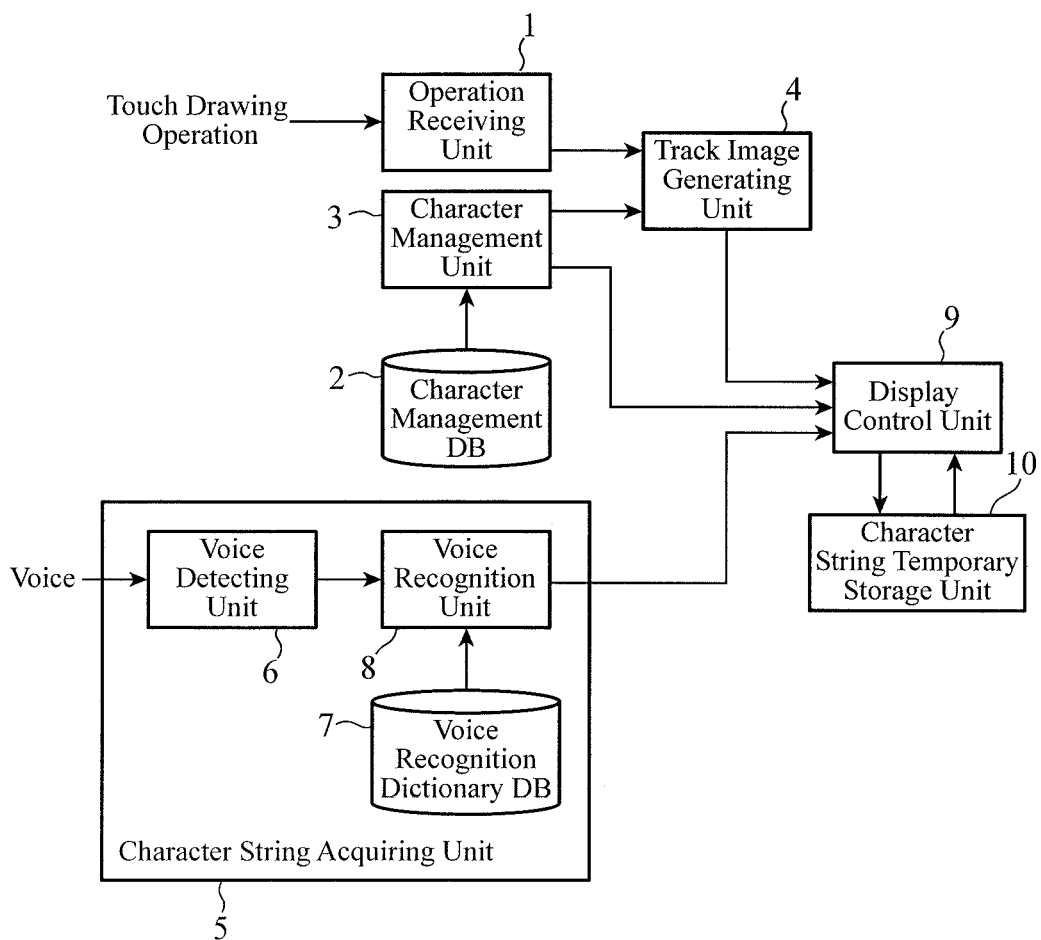
FIG. 1 is a block diagram showing an input display device according to Embodiment 1 of the present invention.
Figure 2:
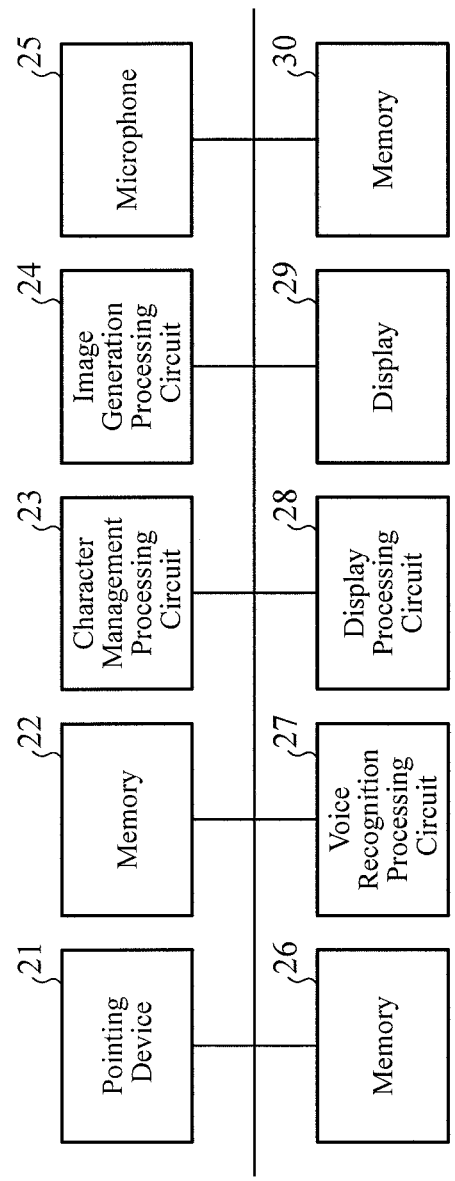
FIG. 2 is a hardware block diagram of the input display device according to Embodiment 1 of the present invention.

FIG. 1 is a block diagram showing an input display device according to Embodiment 1 of the present invention, and FIG. 2 is a hardware block diagram of the input display device according to Embodiment 1 of the present invention.

In the configurations shown in FIGS. 1 and 2, an operation receiving unit 1 is implemented by a pointing device 21, and performs a process of receiving a touch drawing operation as a user's operation.

In this Embodiment 1, although it is assumed that a touch panel is used as the pointing device 21, the pointing device is not limited to a touch panel. For example, a joystick, a pointing stick (trackpoint), a touchpad, a stylus, a data glove, a trackball, a pen tablet, a mouse, a light pen, a joy pad, or the like can be used as the pointing device.

A character management DB 2 is implemented by a memory 22, such as a RAM or a hard disk, and stores a character attribute table showing a correspondence of character types, character sizes, character heights, and character widths.

A character management unit 3 is implemented by a character management processing circuit 23 which is composed of, for example, a semiconductor integrated circuit mounting a CPU (Central Processing Unit), a one chip microcomputer, or the like. The character management unit 3, in which the size of characters to be displayed on a display 29 is preset, performs a process of referring to the character attribute table stored in the character management DB 2, and outputting character attribute information showing the character height corresponding to the size of characters to a track image generating unit 4.

The track image generating unit 4 is implemented by an image generation processing circuit 24 which is composed of, for example, a semiconductor integrated circuit mounting a GPU (Graphics Processing Unit), a one chip microcomputer, or the like. The track image generating unit 4 performs a process of determining the track of a line drawn with touch drawing from a touch drawing operation received by the operation receiving unit 1 to generate a track image showing the track. At this time, the track image generating unit generates a track image to have a line width corresponding to the character height shown by the character attribute information outputted from the character management unit 3.

A character string acquiring unit 5 includes a voice detecting unit 6, a voice recognition dictionary DB 7, and a voice recognition unit 8, and performs a process of acquiring a character string showing a result of recognition of a voice.

The voice detecting unit 6 is implemented by, for example, a microphone 25, and detects a user's voice.

The voice recognition dictionary DB 7 is implemented by a memory 26, such as a RAM or a hard disk, and is composed of, for example, an acoustic model in which the acoustic features of phonemes each of which is a small unit of a human being's utterance are described, and a recognition dictionary in which words each of which is provided for voice recognition are described.

The voice recognition unit 8 is implemented by a voice recognition processing circuit 27 which is composed of, for example, a semiconductor integrated circuit mounting a CPU, a one chip microcomputer, or the like, and has a voice recognition engine mounted thereon, for recognizing the voice detected by the voice detecting unit 6.

Namely, the voice recognition unit 8 performs a process of analyzing the voice detected by the voice detecting unit 6, calculating the acoustic features of the voice, searching through the words described in the recognition dictionary of the voice recognition dictionary DB 7 for words having acoustic features which are the nearest to the calculated acoustic features, and outputting a character string showing the words to a display control unit 9 as a character string showing a result of the recognition of the voice.

Although an example in which the character string acquiring unit 5 implements the voice recognition dictionary DB 7 and the voice recognition unit 8 is shown in FIG. 1, a data transmitting/receiving unit may be implemented instead of the voice recognition dictionary DB 7 and the voice recognition unit 8.

This data transmitting/receiving unit is, for example, network communication apparatus, such as a network card, which can perform transmission and reception of data to and from a voice recognition server not shown in the drawings, via a communication path, such as the Internet or a LAN, and transmits data showing the voice detected by the voice detecting unit 6 to the voice recognition server.

The voice recognition server has a voice recognition engine for recognizing a voice mounted thereon, and, when receiving a data transmitted from the data transmitting/receiving unit and showing the voice, recognizes the voice and transmits the character string showing a result of the recognition of the voice to the data transmitting/receiving unit.

When receiving the character string showing the result of the recognition of the voice and being transmitted from the voice recognition server, the data transmitting/receiving unit outputs the character string to the display control unit 9.

The display control unit 9 is implemented by a display processing circuit 28 which is composed of, for example, a semiconductor integrated circuit implementing a GPU, a one chip microcomputer, or the like. The display control unit 9 performs a process of displaying a track image generated by the track image generating unit 4 on the display 29, and also superimposing the character string acquired by the character string acquiring unit 5 on the track image.

More specifically, when a track image is generated by the track image generating unit 4 before a character string is outputted from the voice recognition unit 8 of the character string acquiring unit 5, the display control unit 9 displays the track image on the display 29, and, after that, superimposes the character string outputted from the voice recognition unit 8 of the character string acquiring unit 5 on the track image. In contrast, when a character string is outputted from the voice recognition unit 8 of the character string acquiring unit 5 before a track image is generated by the track image generating unit 4, the display control unit stands by until a track image is generated by the track image generating unit 4, and, when a track image is generated by the track image generating unit 4, performs a process of displaying the track image on the display 29 and also superimposing the character string on the track image.

The display control unit 9 also performs a process of deleting the display of the track image after superimposing the character string on the track image.

A character string temporary storage unit 10 is implemented by, for example, a memory 30, such as a RAM or a hard disk, and temporarily stores the character string outputted from the voice recognition unit 8 of the character string acquiring unit 5.

In the example shown in FIG. 1, it is assumed that each of the operation receiving unit 1, the character management DB 2, the character management unit 3, the track image generating unit 4, the character string acquiring unit 5, the display control unit 9 and the character string temporary storage unit 10, which is a component of the input display device, is composed of hardware for dedicated use, respectively. As an alternative, the input display device may be composed of a computer.

Figure 3:
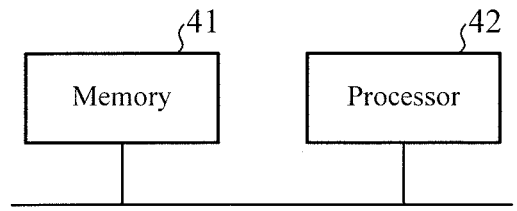
FIG. 3 is a hardware block diagram in a case in which the input display device is composed of a computer.

FIG. 3 is a hardware block diagram in a case in which the input display device is composed of a computer.

In the case in which the input display device is composed of a computer, the character management DB 2, the voice recognition dictionary DB 7 and the character string temporary storage unit 10 are configured on a memory 41 of the computer, a program in which the process performed by each of the operation receiving unit 1, the character management unit 3, the track image generating unit 4, the voice detecting unit 6, the voice recognition unit 8 and the display control unit 9 is described is stored in the memory 41, and a processor 42 is made to execute the program stored in the memory 41.

Figure 4:
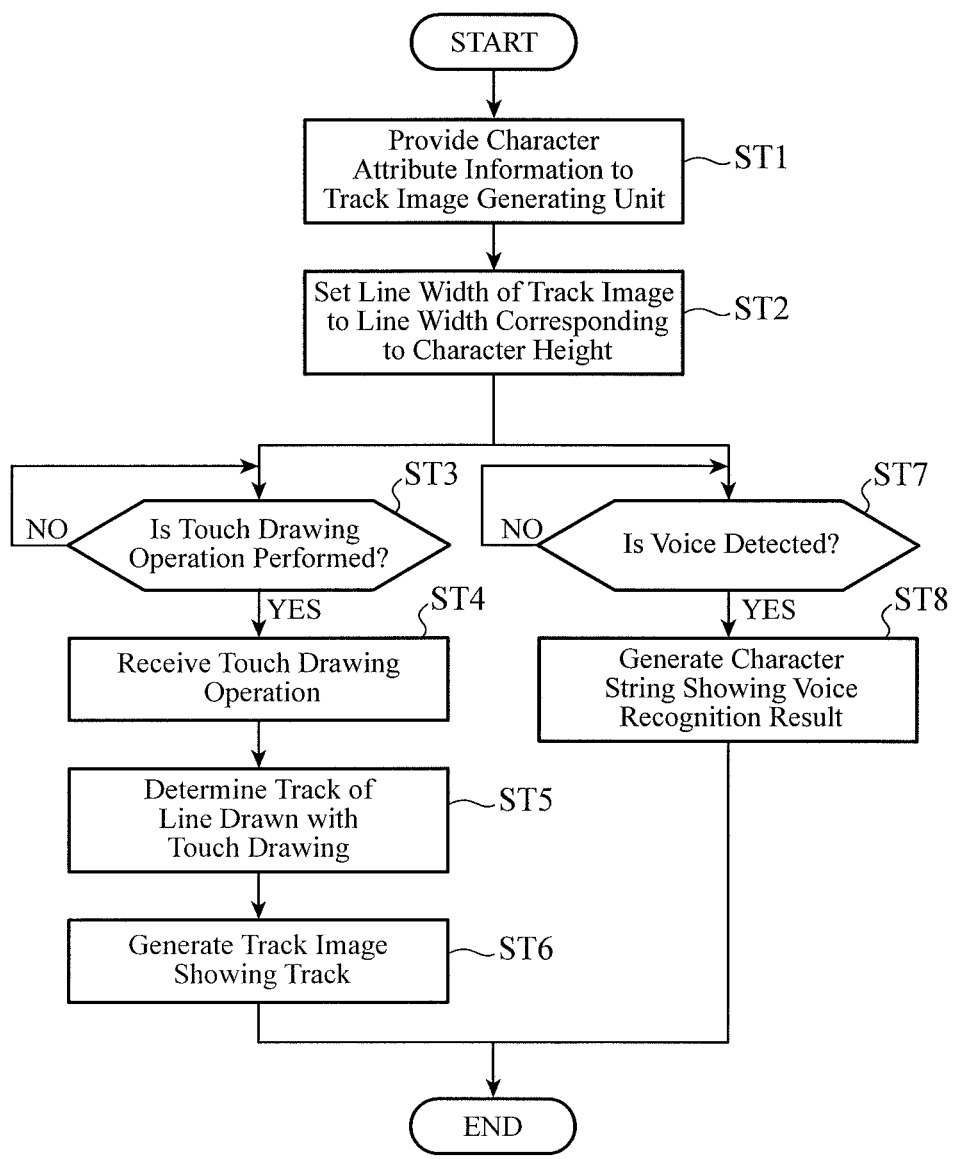
FIG. 4 is a flow chart showing an input display method which represents processing performed by the input display device according to Embodiment 1 of the present invention (first flow chart)
Figures 5, 6:
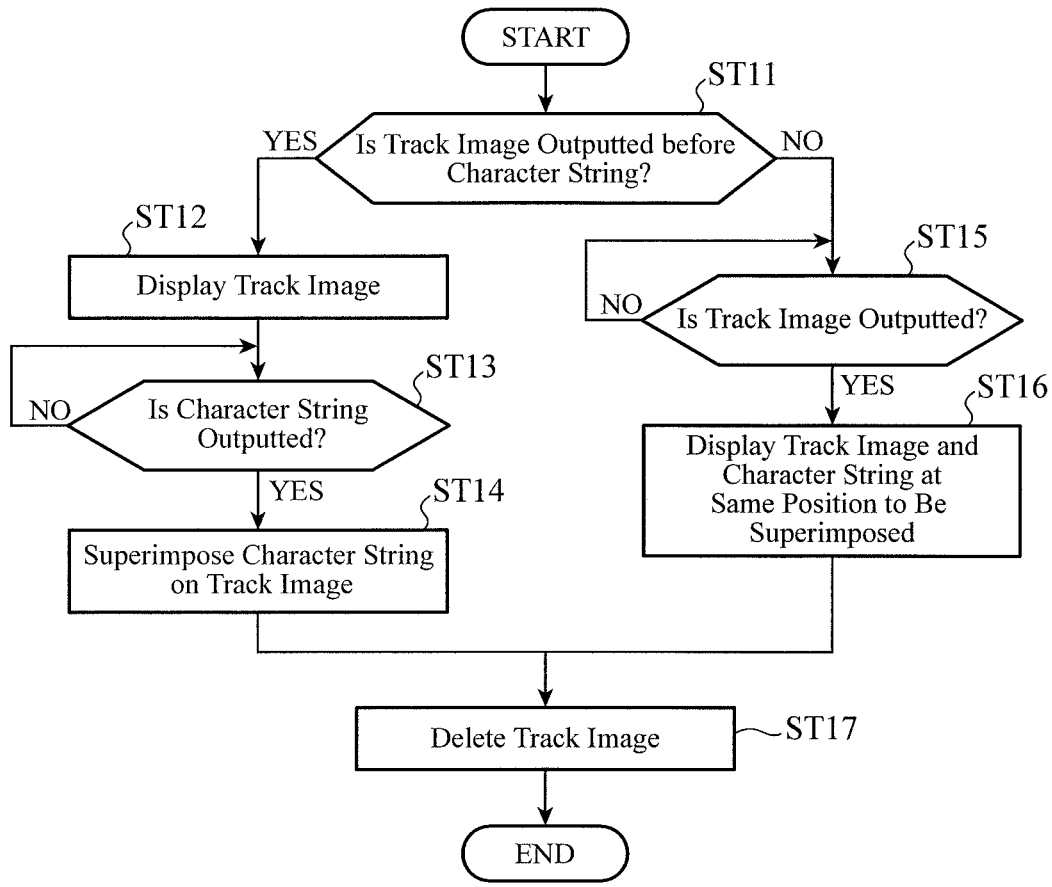
FIG. 5 is a flow chart showing an input display method which represents processing performed by the input display device according to Embodiment 1 of the present invention (second flow chart)
FIG. 6 is an explanatory diagram showing a character attribute table stored in a character management DB.

FIGS. 4 and 5 are flow charts showing an input display method corresponding to processing performed by the input display device according to Embodiment 1 of the present invention.

Next, operations will be explained.

FIG. 6 is an explanatory diagram showing a character attribute table stored in the character management DB 2.

In the character attribute table shown in FIG. 6, for each of character types (e.g. Mincho font and gothic font), character heights and character widths corresponding to character sizes are described.

The size of characters to be displayed on the display 29 is preset to the character management unit 3, and the character management unit 3 outputs character attribute information showing the character height corresponding to the character size to the track image generating unit 4 by referring to the character attribute table stored in the character management DB 2 (step ST1 of FIG. 4).

For example, when the character type of characters which is preset is "A" and the character size is "10", the character attribute information showing that the character height is "5 mm" is outputted to the track image generating unit 4.

When the character type of characters which is preset is "B" and the character size is "5", the character attribute information showing that the character height is "2 mm" is outputted to the track image generating unit 4.

The character management unit 3 also outputs character attribute information showing the character height and the character width corresponding to the character size to the display control unit 9.

When receiving the character attribute information from the character management unit 3, the track image generating unit 4 sets the line width corresponding to the character height shown by the character attribute information as the line width of the track image to be generated (step ST2).

For example, when the character height shown by the character attribute information is "10 mm", if the margin of each of upper and lower parts of each character is set to "0.5 mm", the track image generating unit 4 sets the line width of the track image to "11 mm".

$$11=10+0.5+0.5 \text{ (mm)}$$

Although the example in which a margin is provided for each of the upper and lower parts of each character is shown above, the character height shown by the character attribute information and the line width of a track image can be made to be equal to each other, instead of providing the margins.

Because it is assumed in this Embodiment 1 that the pointing device 21 that implements the operation receiving unit 1 is a touch panel, when a user performs a touch drawing operation on the touch panel using his or her finger, an input pen used for the touch panel, or the like (when YES in step ST3), the operation receiving unit 1 receives the touch drawing operation and outputs information about the touch drawing operation to the track image generating unit 4 (step ST4).

The information about the touch drawing operation corresponds to time series data representing a continuous change in the position (the coordinate values on the touch panel) of either the finger or the input pen in contact with the touch panel.

When receiving the information about the touch drawing operation from the operation receiving unit 1, the track image generating unit 4 determines the track of the line drawn with the touch drawing operation from the operation information (step ST5).

Because the information about the touch drawing operation represents a continuous change in the position of either the finger or the input pen in contact with the touch panel, as mentioned above, the track image generating unit can determine the track of the line drawn with the touch drawing operation by connecting the contact positions in time series.

When the track of the line drawn with the touch drawing operation is determined, the track image generating unit 4 generates a track image showing the track and outputs the track image to the display control unit 9 (step ST6).

Because the line width of this track image is set in step ST2 and is set to "11 mm" in the above-mentioned example, the track image generating unit generates a track image having the line width of "11 mm".

When the voice detecting unit 6 detects the user's voice (when YES in step ST7), the voice recognition unit 8 of the character string acquiring unit 5 performs a recognition process on the voice using the voice recognition dictionary DB 7, thereby generating a character string (text) showing a result of the recognition of the voice, and outputs the character string to the display control unit 9 (step ST8).

Although a detailed explanation of the process will be omitted hereafter because the process of recognizing a voice which is performed by the voice recognition unit 8 is a known technique, the following method can be considered, for example: analyzing the voice detected by the voice detecting unit 6 to calculate the acoustic features of the voice; searching through the words described in the recognition dictionary of the voice recognition dictionary DB 7 for words having acoustic features which are the nearest to the calculated acoustic features; and outputting a character string showing the words as the character string showing the result of the recognition of the voice.

In this Embodiment 1, as an example for explanation, it is assumed that the user uttered "Let's go to see cherry blossoms when spring comes.", and the voice recognition unit 8 outputs a character string showing "Let's go to see cherry blossoms when spring comes."

FIGS. 7A to 7E are explanatory diagrams showing a displaying process when a track image is generated before a character string showing a result of the recognition of a voice is generated.

FIGS. 8A to 8D are explanatory diagrams showing a displaying process when a character string showing a result of the recognition of a voice is generated before a track image is generated.

Figure 7A:
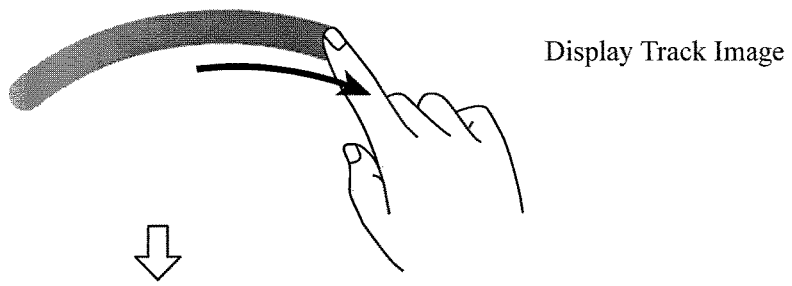
FIGS. 7A to 7E are explanatory diagrams showing a displaying process in a case where a track image is generated before a character string showing a result of recognition of a voice is generated.

When a track image is outputted from the track image generating unit 4 before a character string is outputted from the voice recognition unit 8 of the character string acquiring unit 5 (when Yes in step ST11 of FIG. 5), the display control unit 9 displays the track image on the display 29, as shown in FIG. 7A (step ST12).

The display of the track image can be carried out in such a way that the entire track image is displayed simultaneously. Alternatively, an animation may be displayed in such a way that the track image is displayed sequentially starting from the side of the head of the character string which will be displayed after the display of the track.

Figure 7B:
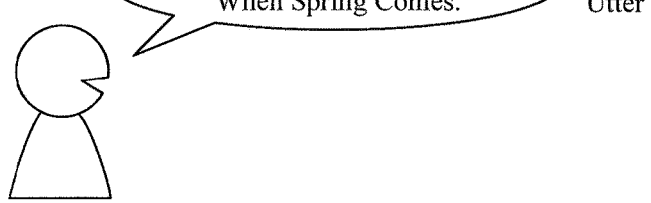
Figure 7C:
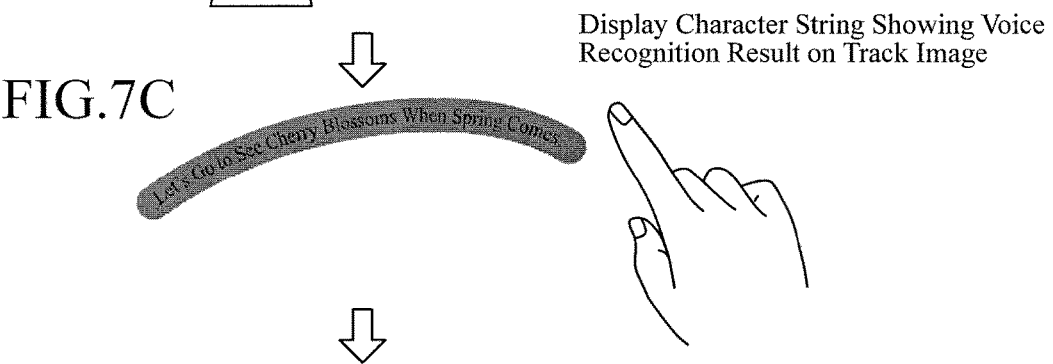
Figure 7D:
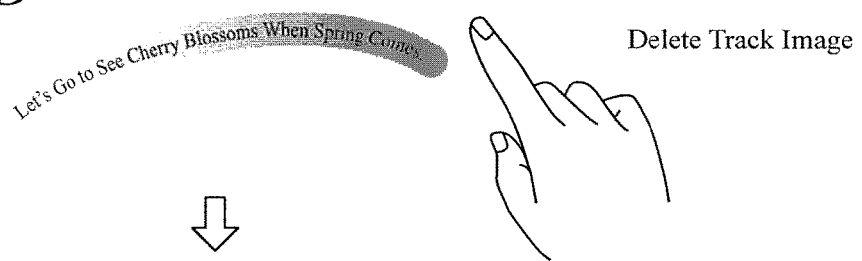
Figure 7E:
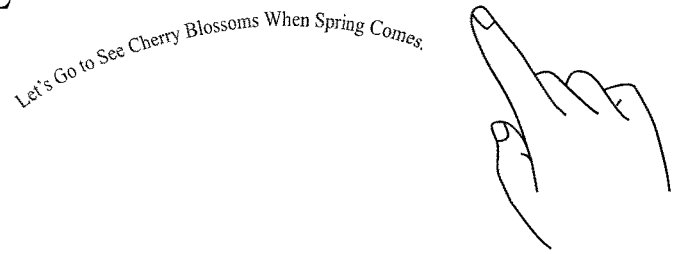

The display control unit 9 stands by until a character string is outputted from the voice recognition unit 8 of the character string acquiring unit 5 (when NO in step ST13), and, when the user provides utterance as shown in FIG. 7B, and as a result, the character string showing the result of the recognition of the voice is outputted from the voice recognition unit 8 (when YES in step ST13), superimposes the character string on the track image, as shown in FIG. 7C (step ST14). The size of the characters in the character string to be displayed on the track image corresponds to the character height and the character width shown by the character attribute information outputted from the character management unit 3.

The display of the character string can be carried out in such a way that all the characters which constitute the character string are displayed simultaneously. Alternatively, the character string may be displayed by animation in which the characters are sequentially displayed in order starting from the first character of the character string and ending with the last character of the character string.

Figure 8A:
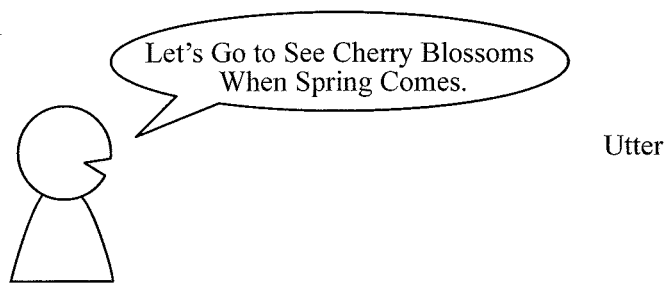
FIGS. 8A to 8D are an explanatory diagrams showing a displaying process in a case where a character string showing a result of recognition of a voice is generated before a track image is generated.

When, as a result of the user's utterance before the user performs a touch drawing operation, as shown in FIG. 8A, a character string is outputted from the voice recognition unit 8 of the character string acquiring unit 5 before a track image is outputted from the track image generating unit 4 (when NO in step ST11 of FIG. 5), the display control unit 9 stores the character string in the character string temporary storage unit 10, and stands by until a track image is outputted from the track image generating unit 4 (when NO in step ST15).

Figure 8B:
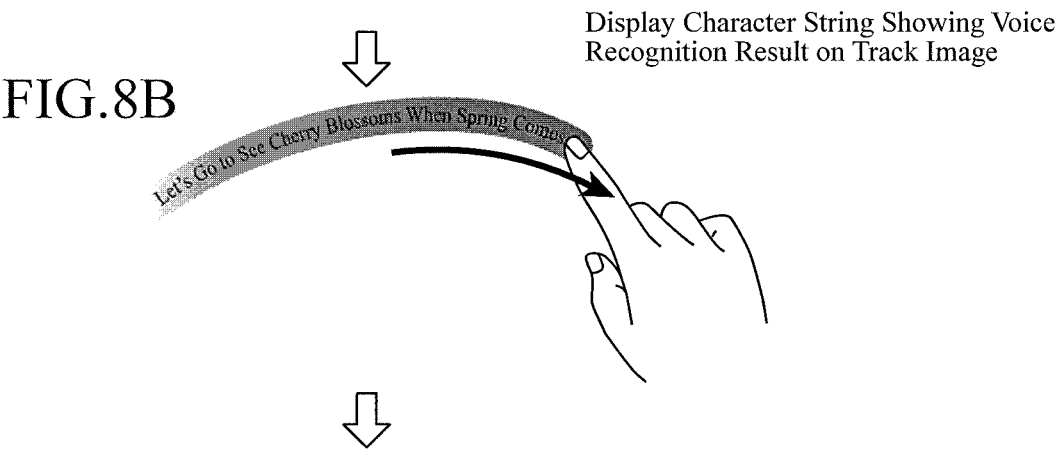
Figure 8C:
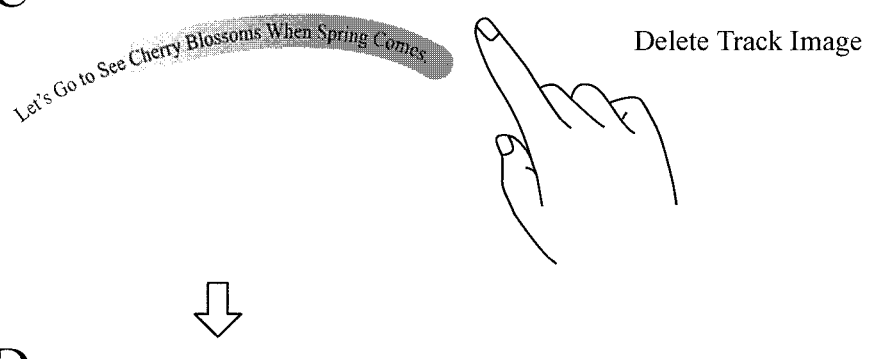
Figure 8D:
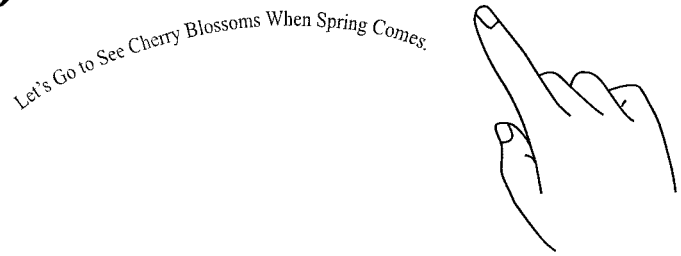

After that, when a track image is outputted from the track image generating unit 4 as a result of the user performing a touch drawing operation (when YES in step ST15), the display control unit 9 reads out the character string from the character string temporary storage unit 10, and displays the track image on the display 29 and also superimposes the character string on the track image, as shown in FIG. 8B. Namely, the display control unit 9 displays the track image and the character string at the same position to be superimposed (step ST16). Although the display of the track image and the character string can be carried out in such a way that the entire track image and the entire character string are displayed simultaneously, the character string and the track image may be alternatively displayed by animation in which the character string and the track image are displayed sequentially starting from the side of the head of the character string.

After superimposing the character string on the track image, the display control unit 9 deletes the track image and then enters a state in which the display control unit displays only the character string, as shown in FIGS. 7D, 7E, 8C and 8D (step ST17).

Although the deletion of the track image can be carried out by deleting the entire track image simultaneously, an animation in which the track image is deleted sequentially starting from the side of the head of the character string may be alternatively displayed.

In this embodiment, it is assumed that a track image and a character string are displayed while the character string is superimposed on the track image, and, after that, the track image is deleted after a lapse of a fixed time period. Alternatively, the track image may be deleted immediately after the display of the character string is completed.

As can be seen from the above description, in this Embodiment 1, the operation receiving unit 1 for receiving a touch drawing operation, the track image generating unit 4 for determining the track of a line drawn with touch drawing operation received by the operation receiving unit 1 to generate a track image showing the track, and the character string acquiring unit 5 for acquiring a character string showing a result of recognition of a voice are provided, and the display control unit 9 displays the track image generated by the track image generating unit 4 on the display 29, and also superimposes the character string acquired by the character string acquiring unit 5 on the track image. As a result, there is provided an effect of being able to display the character string showing the result of the recognition of the voice in a layout flexibly set by a user.

Further, in this Embodiment 1, when a track image is generated by the track image generating unit 4 before a character string is outputted by the voice recognition unit 8 of the character string acquiring unit 5, the display control unit 9 superimposes the character string outputted by the voice recognition unit 8 of the character string acquiring unit 5 on the track image after displaying the track image on the display 29, whereas when a character string is outputted by the voice recognition unit 8 of the character string acquiring unit 5 before a track image is generated by the track image generating unit 4, the display control unit 9 stands by until a track image is generated by the track image generating unit 4, and, when a track image is generated by the track image generating unit 4, displays the track image on the display 29 and also superimposes the character string on the track image. As a result, the user can grasp the position at which a character string showing a result of recognition of a voice is to be displayed in advance, when performing a touch drawing operation before utterance. Therefore, it is advantageous that a user can grasp how the character string is displayed. Further, when the user provides utterance before performing a touch drawing operation, a track image and a character string are superimposed and displayed at the same position immediately after the user performs a touch drawing operation. As a result, it is advantageous that the user can enjoy an operation feeling with high responsivity.

Embodiment 2

In the example described in the above Embodiment 1, the line width corresponding to the character height of a preset character size is set as the line width of a track image is shown. Alternatively, the line width of a track image can be set in accordance with the state of a user's touch drawing operation.

Figure 9:
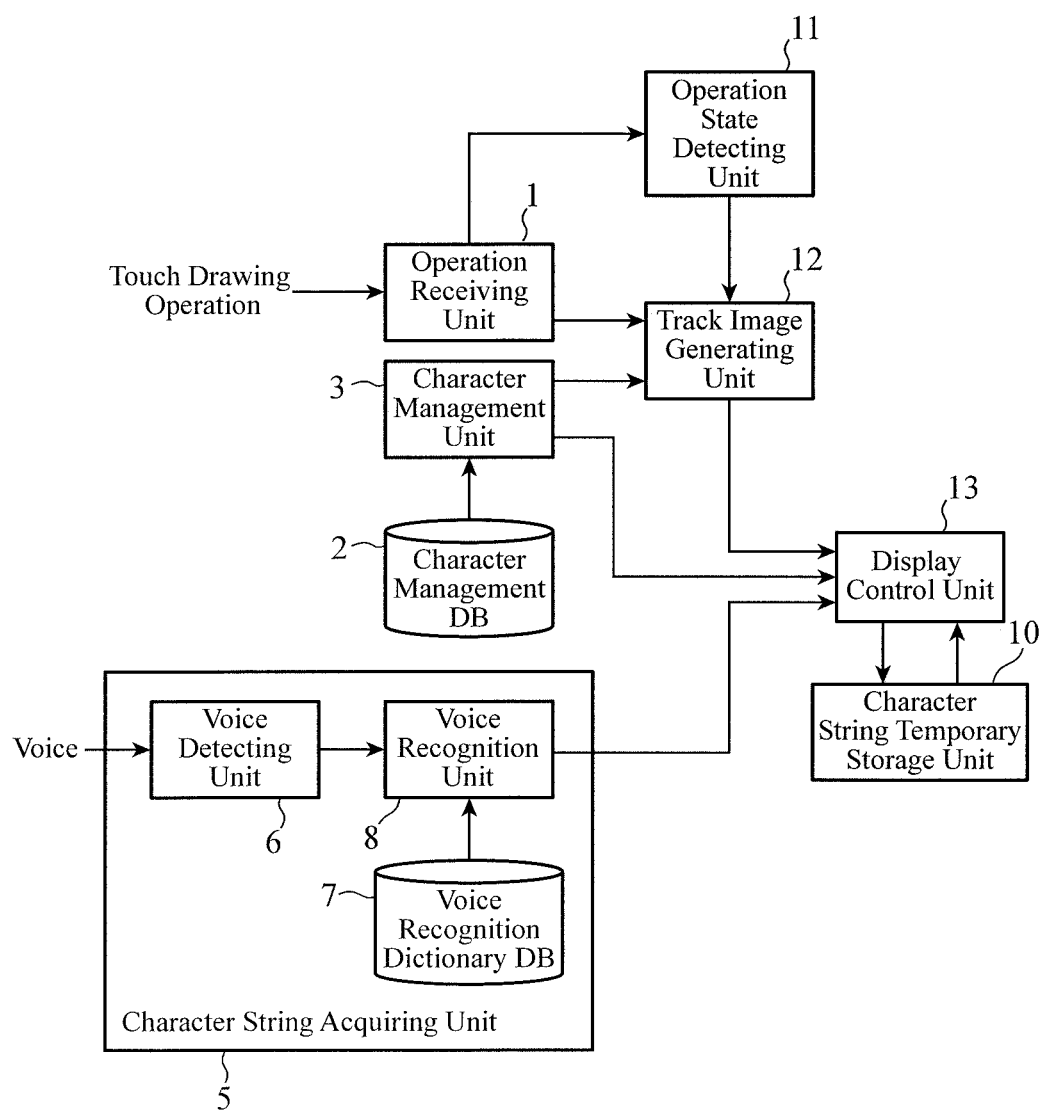
FIG. 9 is a block diagram showing an input display device according to Embodiment 2 of the present invention.
Figure 10:
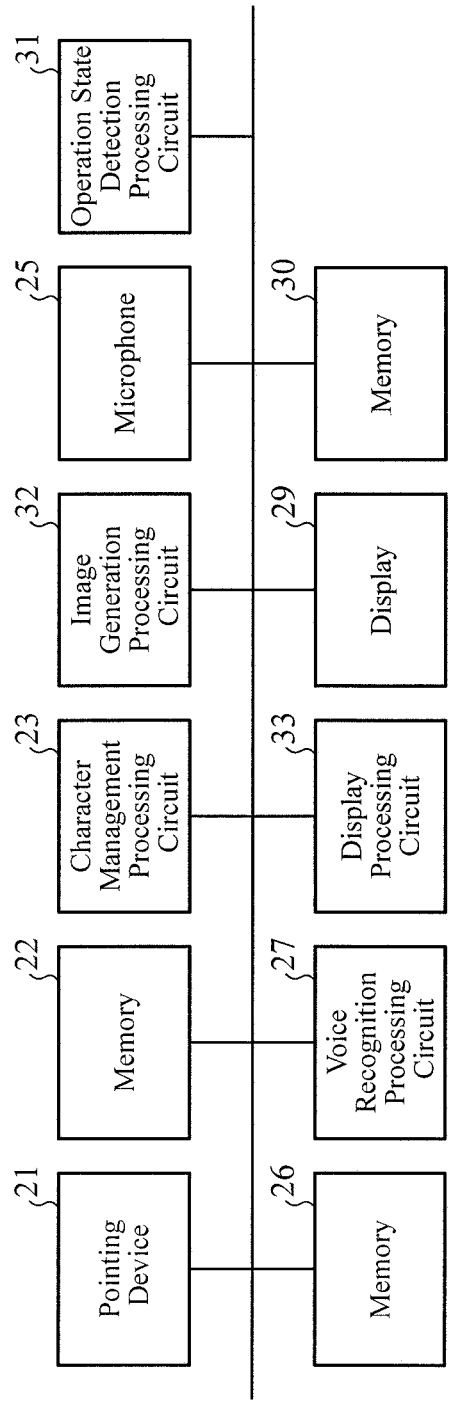
FIG. 10 is a hardware block diagram of the input display device according to Embodiment 2 of the present invention.

FIG. 9 is a block diagram showing an input display device according to Embodiment 2 of the present invention, and FIG. 10 is a hardware block diagram of the input display device according to Embodiment 2 of the present invention.

In FIGS. 9 and 10, the same reference numerals as those shown in FIGS. 1 and 2 denote the same or corresponding components, and the explanation of such components will be omitted hereafter.

An operation state detecting unit 11 is implemented by an operation state detection processing circuit 31 which is composed of, for example, a semiconductor integrated circuit implementing a CPU, a one chip microcomputer, or the like, and performs a process of detecting the state of an operation received by an operation receiving unit 1.

More specifically, the operation state detecting unit 11 detects, for example, the pressure (writing pressure) of either a user's finger or an input pen which is applied to a touch panel being a pointing device 21, as the state of an operation received by the operation receiving unit 1.

A track image generating unit 12 is implemented by an image generation processing circuit 32 which is composed of, for example, a semiconductor integrated circuit implementing a GPU, a one chip microcomputer, or the like. The track image generating unit 12 performs a process of determining the track of a line drawn with touch drawing operation received by the operation receiving unit 1 to generate a track image showing the track, like the track image generating unit 4 shown in FIG. 1. At this time, the track image generating unit 4 generates a track image having a line width corresponding to the state of an operation detected by the operation state detecting unit 11, unlike the track image generating unit 4 shown in FIG. 1.

A display control unit 13 is implemented by a display processing circuit 33 which is composed of, for example, a semiconductor integrated circuit implementing a GPU, a one chip microcomputer, or the like, and performs the same displaying process as that performed by the display control unit 9 shown in FIG. 1.

The display control unit 13 performs a process of changing the character size of the characters which constitute a character string acquired by a character string acquiring unit 5 in accordance with the line width set by the track image generating unit 12, and superimposing the character string with the changed character size on the track image.

In the example shown in FIG. 9, it is assumed that each of the operation receiving unit 1, a character management DB 2, a character management unit 3, the operation state detecting unit 11, the track image generating unit 12, the character string acquiring unit 5, the display control unit 13 and a character string temporary storage unit 10, which is a component of the input display device, is composed of hardware for dedicated use, respectively. As an alternative, the input display device may be composed of a computer.

In the case in which the input display device is composed of a computer, the character management DB 2, a voice recognition dictionary DB 7 and the character string temporary storage unit 10 are configured on a memory 41 of the computer as shown in FIG. 3, a program in which the details of the process performed by each of the operation receiving unit 1, the character management unit 3, the operation state detecting unit 11, the track image generating unit 12, a voice detecting unit 6, a voice recognition unit 8 and the display control unit 13 is described is stored in the memory 41, and a processor 42 is made to execute the program stored in the memory 41.

Figure 11:
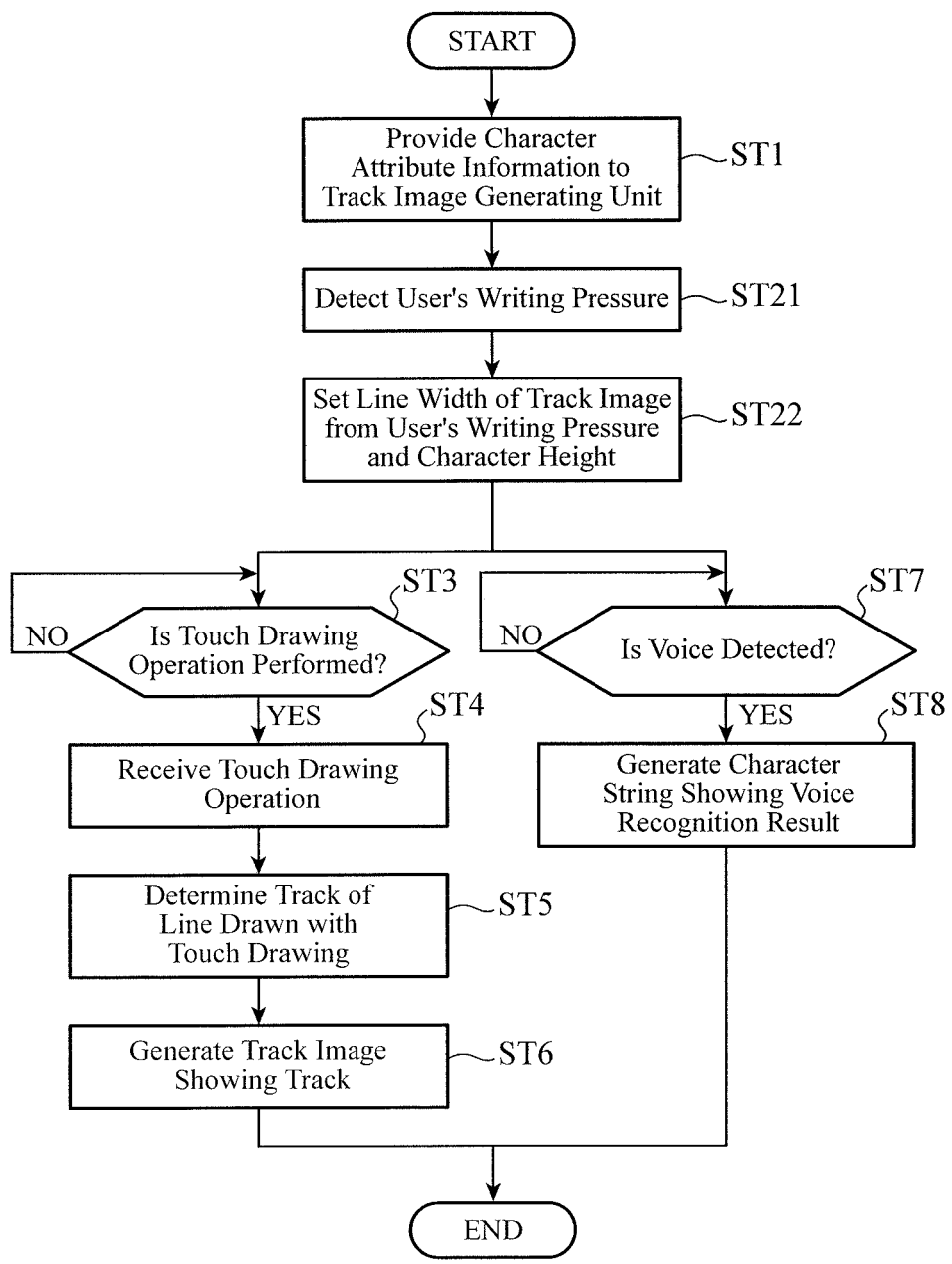
FIG. 11 is a flow chart showing an input display method which represents processing performed by the input display device according to Embodiment 2 of the present invention.

FIGS. 11 and 5 are flow charts showing an input display method corresponding to processing performed by the input display device according to Embodiment 2 of the present invention.

In FIG. 11, the same step numbers as those of FIG. 4 show the same or corresponding processes.

Next, operations will be explained.

In this Embodiment 2, it is assumed that a writing pressure sensor for detecting writing pressure is mounted on the touch panel being the pointing device 21.

The operation state detecting unit 11 acquires a result of the detection of writing pressure from the writing pressure sensor mounted on the pointing device 21, thereby detecting a user's writing pressure on the touch panel being the pointing device 21, as the state of the operation received by the operation receiving unit 1 (step ST21 of FIG. 11).

When the operation state detecting unit 11 detects the user's writing pressure as the state of the operation received by the operation receiving unit 1, the track image generating unit 12 sets the line width of a track image to be generated on the basis of both the user's writing pressure and the character height shown by character attribute information outputted from the character management unit 3 (step ST22).

For example, when the character height shown by the character attribute information is set as a reference line width of a track image, and the user's writing pressure is greater than or equal to a preset reference value, the track image generating unit 12 sets an offset value which increases with increase in the writing pressure from the reference value, and determines a value which the track image generating unit 12 acquires by adding the reference line width and the offset value, as the final result showing the line width of a track image.

Final Line Width of Track Image=Reference Line Width+ Offset Value

In contrast, when the user's writing pressure is less than the preset reference value, the track image generating unit 12 sets an offset value which increases with decrease in the writing pressure from the reference value, and determines a value which the track image generating unit 12 acquires by subtracting the offset value from the reference line width, as the final result showing the line width of a track image.

Final Line Width of Track Image=Reference Line Width− Offset Value

The display control unit 13 displays a track image and a character string on a display 29 in accordance with the flow chart of FIG. 5, like the display control unit 9 shown in FIG. 1.

Because the line width of a track image is set in accordance with the user's writing pressure in this Embodiment 2, when the track image generating unit 12 sets the final line width of a track image to be thicker than the reference line width, the display control unit enlarges the character size of the characters which constitute the character string in accordance with the final line width of a track image, and displays the character string on the track image.

For example, when the reference line width (=the character height shown by the character attribute information) is "5 mm", if the final line width of a track image is set to "10 mm", the display control unit changes the character height of the characters which constitute the character string to "10 mm", and displays the character string on the track image. Although the example in which the character height and the line width of a track image are made to match each other is shown above, when a margin is provided for each of the upper and lower parts of each character, for example, when the margin of each of the upper and lower parts of each character is "1 mm", the display control unit changes the character height of the characters which constitute the character string to "8 mm", and displays the character string on the track image.

Further, when the track image generating unit 12 sets the final line width of a track image to be thinner than the reference line width, the display control unit 13 reduces the character size of the characters which constitute the character string in accordance with the final line width of a track image, and displays the character string on the track image.

For example, when the reference line width (=the character height shown by the character attribute information) is "5 mm", if the final line width of a track image is set to "3 mm", the display control unit changes the character height of the characters which constitute the character string to "3 mm", and displays the character string on the track image. Although the example in which the character height and the line width of a track image are made to match each other is shown above, when a margin is provided for each of the upper and lower parts of each character, for example, when the margin of each of the upper and lower parts of each character is "0.5 mm", the display control unit changes the character height of the characters which constitute the character string to "2 mm", and displays the character string on the track image.

Figure 12A:
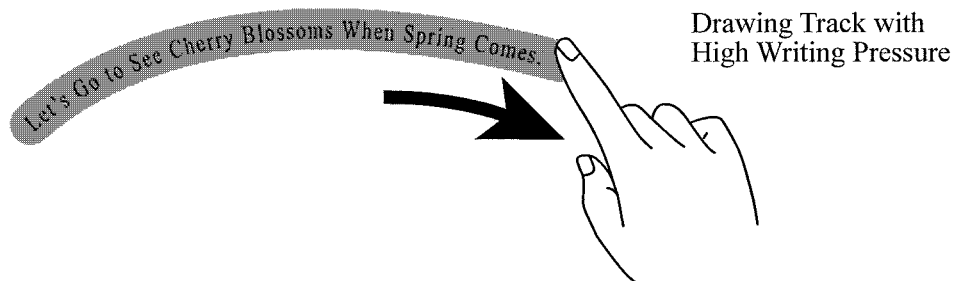
FIGS. 12A and 12B are explanatory diagrams showing a track image for which a line width is set in accordance with a user's writing pressure.

FIGS. 12A and 21B are explanatory diagrams showing a track image for which a line width is set in accordance with the user's writing pressure.

Figure 12B:
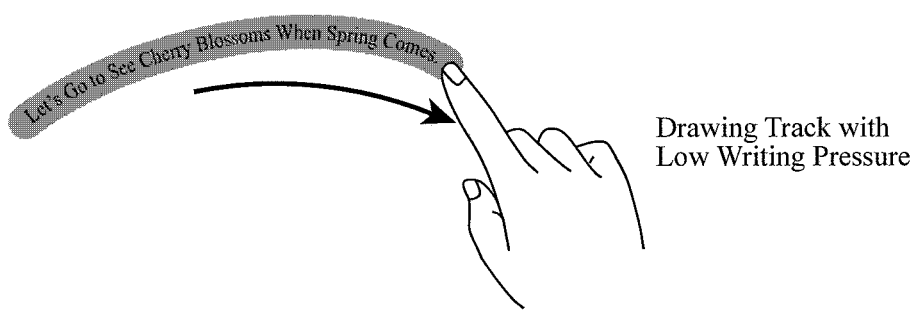

FIG. 12A shows a track image for which a thick line width is set because the user's writing pressure is greater than or equal to the reference value, and FIG. 12B shows a track image for which a thin line width is set because the user's writing pressure is less than the reference value.

In this Embodiment 2, the example in which the operation state detecting unit 11 detects the user's writing pressure on the touch panel being a pointing device 21, as the state of an operation received by the operation receiving unit 1 is shown. However, this is merely an example. For example, the operation state detecting unit 11 may alternatively detect the speed at which the user draws a line on the touch panel being the pointing device 21, as the state of an operation received by the operation receiving unit 1.

The operation state detecting unit 11 can determine the speed at which the user draws a line on the touch panel from a change in the contact position of the touch panel per unit time by simply specifying a continuous change in the contact position of the touch panel from information about a touch drawing operation received by the operation receiving unit 1.

When the operation state detecting unit 11 detects the speed at which the user draws a line on the touch panel as the state of an operation received by the operation receiving unit 1, the track image generating unit 12 sets the line width of the track image to be generated on the basis of both the touch drawing speed and the character height shown by the character attribute information outputted from the character management unit 3.

For example, when the character height shown by the character attribute information is set as the reference line width of a track image, and the touch drawing speed is higher than or equal to a preset reference value, the track image generating unit 12 sets an offset value which increases with increase in the touch drawing speed from the reference value, and determines the value acquired by adding the reference line width and the offset value as the final result of the line width of a track image.

Final Line Width of Track Image=Reference Line Width+ Offset Value

In contrast, when the touch drawing speed is lower than the preset reference value, the track image generating unit sets an offset value which increases with decrease in the touch drawing speed from the reference value, and determines a value which the track image generating unit acquires by subtracting the offset value from the reference line width, as the final result of the line width of a track image.

Final Line Width of Track Image=Reference Line Width− Offset Value

Figure 13A:
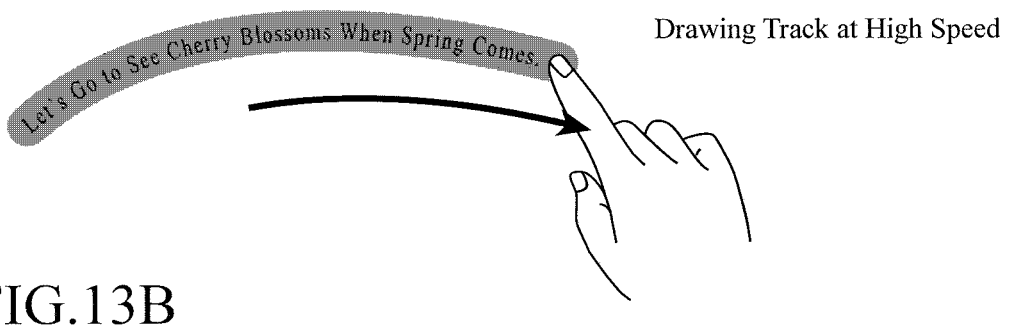
FIGS. 13A and 13B are an explanatory diagrams showing a track image for which a line width is set in accordance with a touch drawing speed.
Figure 13B:
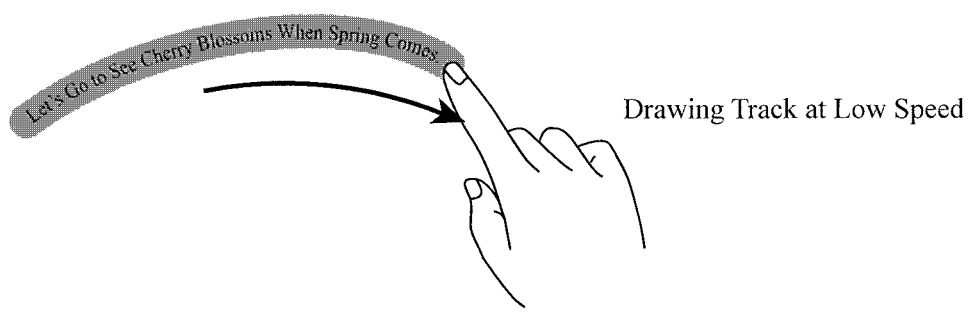

FIGS. 13A and 13B are explanatory diagrams showing a track image for which a line width is set in accordance with the touch drawing speed.

FIG. 13A shows a track image for which a thick line width is set because the touch drawing speed is higher than or equal to the reference value, and FIG. 13B shows a track image for which a thin line width is set because the touch drawing speed is lower than the reference value.

In this Embodiment 2, an example in which the user's writing pressure or touch drawing speed is uniform is shown. Additionally, when the user's writing pressure or touch drawing speed changes while the user draws a line, the track image generating unit 12 may generate a track image whose line width changes at some middle points therein.

Figure 14A:
FIGS. 14A and 14B are explanatory diagrams showing a track image for which a line width is set in accordance with either a user's writing pressure or touch drawing speed which changes while the user draws a line.
Figure 14B:
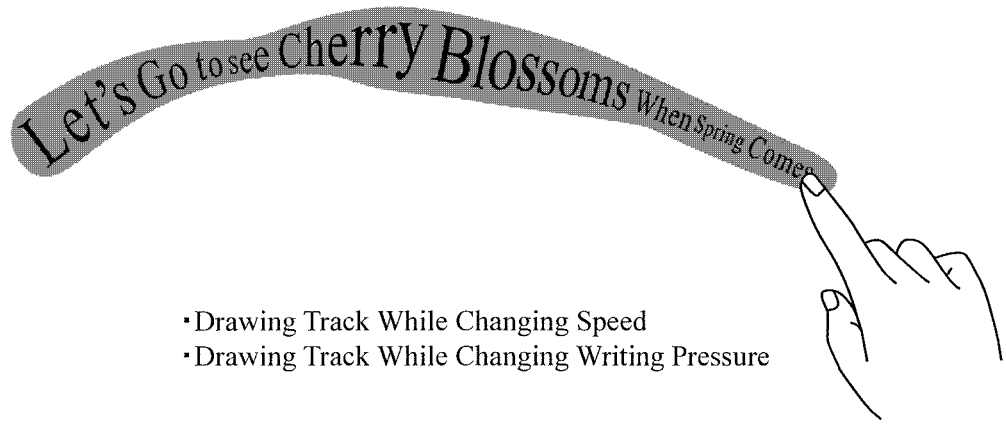

FIGS. 14A and 14B are explanatory diagrams showing a track image for which a line width is set in accordance with the user's writing pressure or touch drawing speed which changes while the user draws a line.

FIG. 14A shows a track image in a case in which the touch drawing speed gradually increases or in a case in which the user's writing pressure gradually increases. In this example, the line width of the track image gradually increases.

FIG. 14B shows a track image in a case in which the touch drawing speed or the user's writing pressure changes irregularly. In this example, the line width of the track image becomes thicker and thinner irregularly while the user draws a line.

As can be seen from the above description, in this Embodiment 2, the operation state detecting unit 11 for detecting the state of an operation received by the operation receiving unit 1 is provided, and the track image generating unit 12 generates a track image having a line width corresponding to the state of the operation detected by the operation state detecting unit 11. As a result, there is provided an advantage of being able to increase the variety of display forms of the character string.

In this Embodiment 2, the example in which the track image generating unit 12 sets the line width of a track image to be generated on the basis of both the state of the operation received by the operation receiving unit 1 (e.g. the user's writing pressure), the state being detected by the operation state detecting unit 11, and the character height shown by the character attribute information outputted from the character management unit 3 is shown. Alternatively, the track image generating unit may set the line width of a track image to be generated only from the state of the operation received by the operation receiving unit 1, without using the character height shown by the character attribute information outputted from the character management unit 3.

For example, there can be provided an example in which a table storing a correspondence between the user's writing pressure (or touch drawing speed) and the line width of a track image is prepared, and the track image generating unit 12 reads out the line width corresponding to the user's writing pressure (or touch drawing speed) from the table, and sets the line width as the line width of a track image.

In this embodiment 2, the example in which a track image having a line width corresponding to the state of the operation received by the operation receiving unit 1 is generated is shown. Alternatively, the lightness or darkness of characters to be displayed on the display 29 may be changed in accordance with the state of the operation received by the operation receiving unit 1. For example, there can be provided an example in which the lightness or darkness of characters is increased to be darker with increase in either of the user's writing pressure or the touch drawing speed. Further, the line weight of characters to be displayed on the display 29 may be changed in accordance with the state of the operation received by the operation receiving unit 1. For example, there can be provided an example in which the line weight of characters is increased with increase in either of the user's writing pressure or the touch drawing speed.

In the above example, the character height of characters to be superimposed on the track image is changed in accordance with the line width of the track image generated by the track image generating unit 12. Alternatively, the character type of the characters which constitute the character string can be changed in accordance with the line width of the track image.

For example, there can be provided an example in which when the line width of the track image gradually increases, the character type is changed from a character type A, to a character type B, and finally to a character type C.

Embodiment 3

In above-mentioned Embodiments 1 and 2, examples in which the display control unit 9, 13 displays a track image generated by the track image generating unit 4 on the display 29 are shown. Further, by acquiring a result of the determination of the language of a voice, a track image may be displayed in a color corresponding to the language shown by the determination result.

Figure 15:
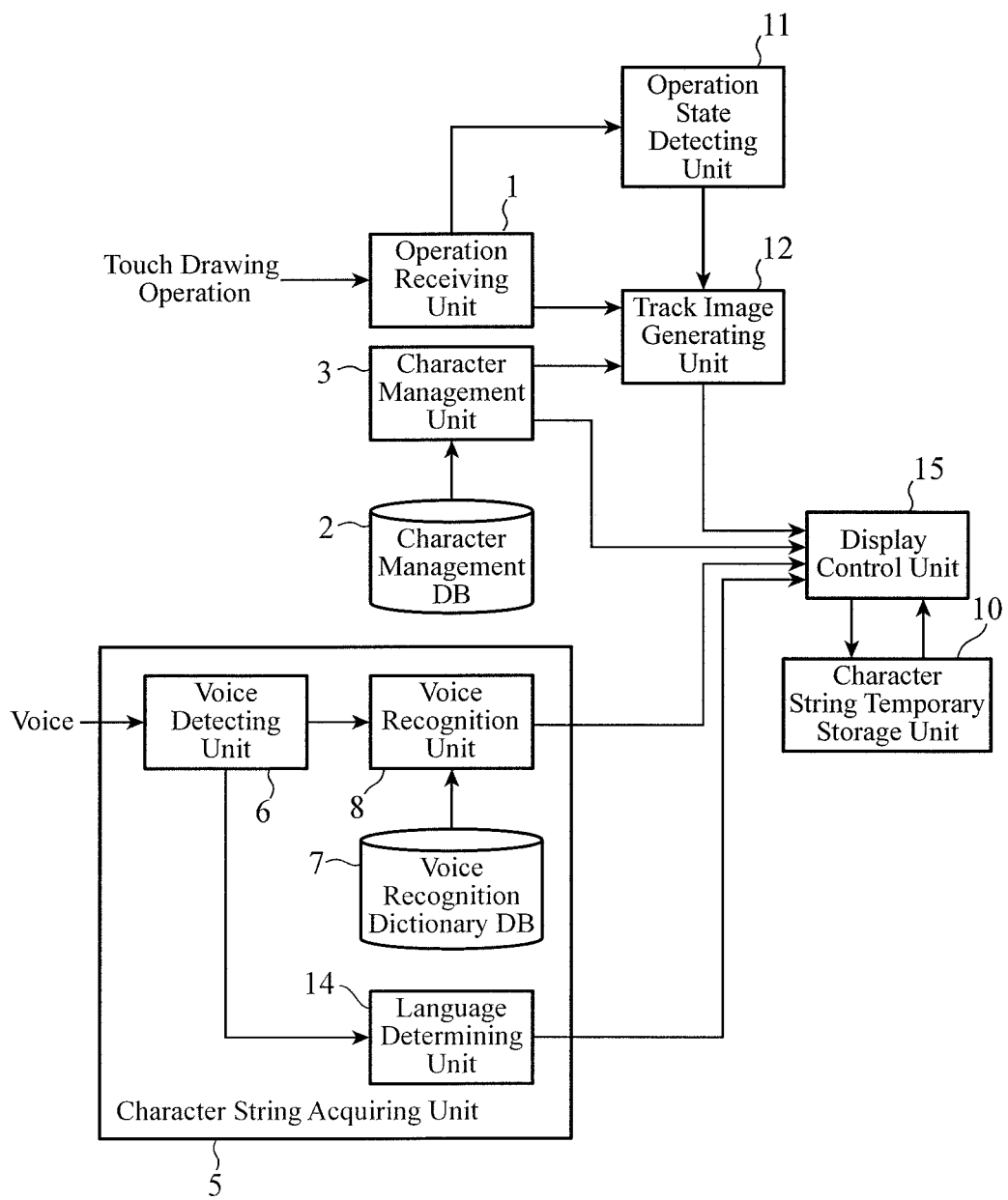
FIG. 15 is a block diagram showing an input display device according to Embodiment 3 of the present invention.
Figure 16:
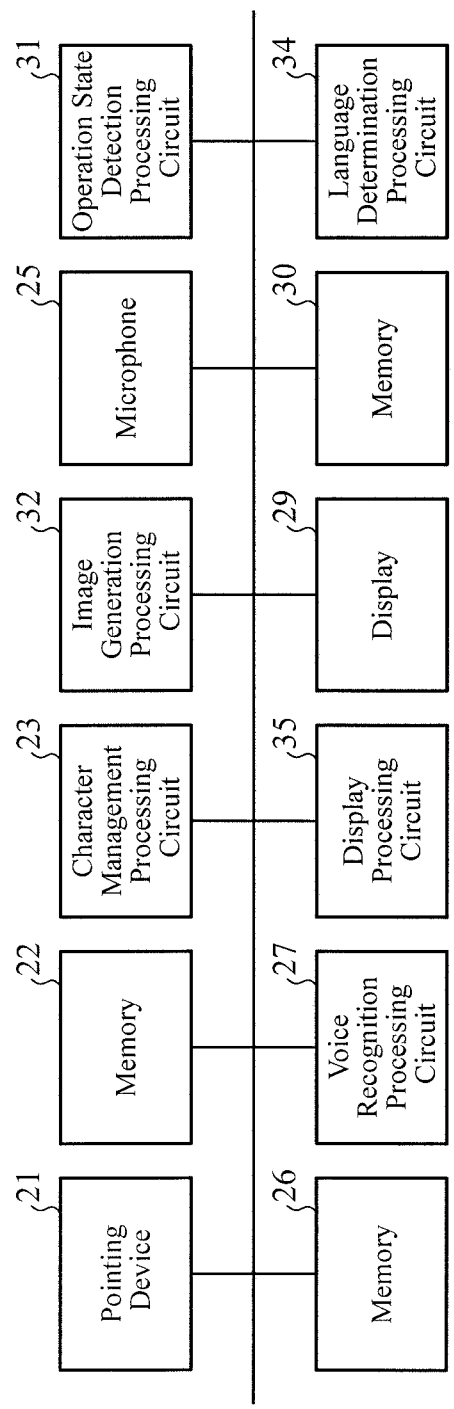
FIG. 16 is a hardware block diagram of the input display device according to Embodiment 3 of the present invention.

FIG. 15 is a block diagram showing an input display device according to Embodiment 3 of the present invention, and FIG. 16 is a hardware block diagram of the input display device according to Embodiment 3 of the present invention.

In FIGS. 15 and 16, the same reference numerals as those shown in FIGS. 9 and 10 denote the same or corresponding components, so that the explanation of the components will be omitted hereafter.

A language determining unit 14 of a character string acquiring unit 5 is implemented by a language determination processing circuit 34 which is composed of, for example, a semiconductor integrated circuit implementing a CPU, a one chip microcomputer, or the like, and performs a process of determining the language of a voice detected by the voice detecting unit 6, and outputting the result of the determination of the language to a display control unit 15.

In this Embodiment 3, an example in which the character string acquiring unit 5 implements the language determining unit 14 is shown. Alternatively, a data transmitting/receiving unit can be installed instead of the language determining unit 14.

This data transmitting/receiving unit is, for example, a network communication apparatus, such as a network card, which can perform transmission and reception of data to and from a language determination server not shown in the drawings, via a communication path, such as the Internet or a LAN, and transmits data showing the voice detected by the voice detecting unit 6 to the language determination server.

The language determination server has a language determination engine mounted thereon, for determining the language of the voice, and when receiving the data showing the voice transmitted from the data transmitting/receiving unit, recognizes the voice and transmits a result of the determination of the language of the voice to the data transmitting/receiving unit.

This data transmitting/receiving unit outputs the result of determination of the language of the voice, which is transmitted from the language determination server, to the display control unit 15.

The display control unit 15 is implemented by a display processing circuit 35 which is composed of, for example, a semiconductor integrated circuit implementing a GPU, a one chip microcomputer, or the like, and performs the same displaying process as that performed by the display control unit 13 shown in FIG. 9.

The display control unit 15 also performs a process of displaying a track image generated by a track image generating unit 12 on a display 29 in a color corresponding to the language shown by the determination result outputted from the language determining unit 14.

In the example shown in FIG. 15, it is assumed that each of an operation receiving unit 1, a character management DB 2, a character management unit 3, an operation state detecting unit 11, the track image generating unit 12, the character string acquiring unit 5, the display control unit 15 and a character string temporary storage unit 10, which is a component of the input display device, is composed of hardware for dedicated use, respectively. As an alternative, the input display device may be composed of a computer.

In the case in which the input display device is composed of a computer, the character management DB 2, a voice recognition dictionary DB 7 and the character string temporary storage unit 10 are configured on a memory 41 of the computer, a program in which the details of the process performed by each of the operation receiving unit 1, the character management unit 3, the operation state detecting unit 11, the track image generating unit 12, the voice detecting unit 6, a voice recognition unit 8, the language determining unit 14 and the display control unit 15 is described is stored in the memory 41, and a processor 42 is made to execute the program stored in the memory 41.

Figure 17:
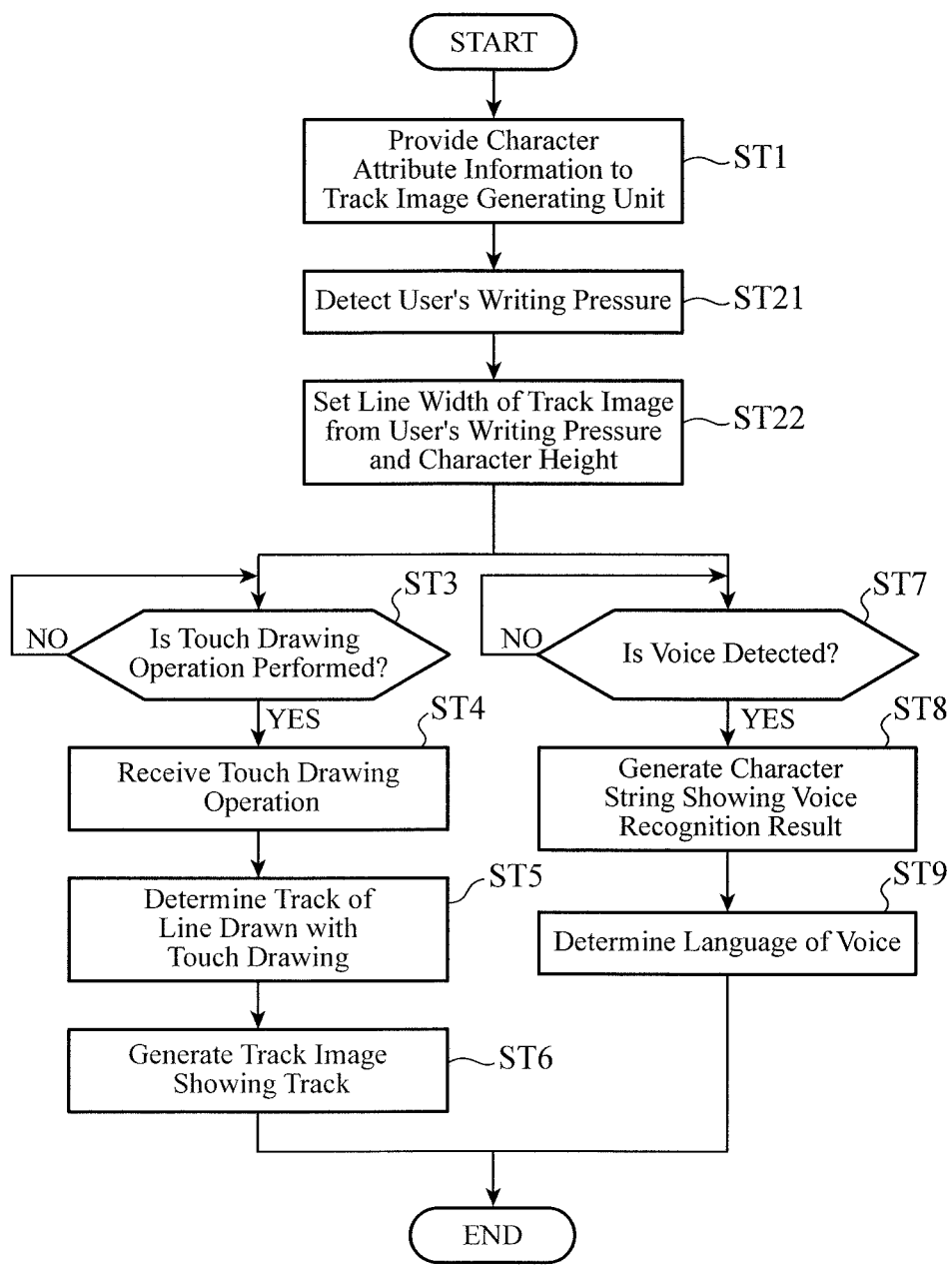
FIG. 17 is a flow chart showing an input display method which represents processing performed by the input display device according to Embodiment 3 of the present invention.

FIGS. 17 and 5 are flow charts showing an input display method being processing performed by the input display device according to Embodiment 3 of the present invention.

In FIG. 17, the same step numbers as those of FIG. 11 show the same or corresponding processes.

Next, operations will be explained.

When the voice detecting unit 6 detects a user's voice, the language determining unit 14 of the character string acquiring unit 5 performs the process of determining the language of the voice, and outputs the result of the determination of the language to the display control unit 15 (step ST9 of FIG. 17). Because the voice language determining process is a known technique, a detailed explanation of this process will be omitted hereafter.

The display control unit 15 displays a track image and a character string on the display 29 in accordance with the flow chart of FIG. 5, like the display control unit 13 shown in FIG. 9.

At this stage, the display control unit 15 displays the track image generated by the track image generating unit 12 on the display 29 in a color corresponding to the language shown by the determination result outputted from the language determining unit 14, which is different to the processing performed by the display control unit 13 shown in FIG. 9.

Because the language determining unit 14 cannot determine the language of the user's voice before the voice detecting unit 6 detects the voice, when a track image is generated by the track image generating unit 12 before the voice detecting unit 6 detects the user's voice, the display control unit 15 does not display the track image before the voice detecting unit 6 detects the user's voice.

Alternatively, the display control unit may perform processing of displaying the track in a gray color until the voice detecting unit 6 detects the user's voice, and, when the voice detecting unit detects the user's voice and a result of the determination of the language is acquired, displaying the track image in a color corresponding to the language.

FIG. 18 is an explanatory diagram showing the color of a track image, the color corresponding to the language of a voice.

Figures 18A, 18B:
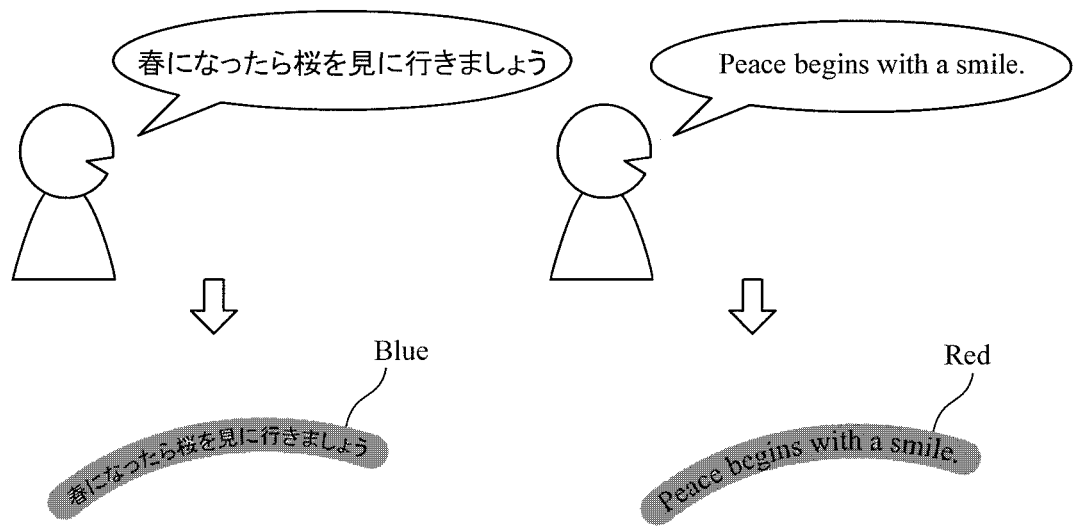
FIGS. 18A and 18B are explanatory diagrams showing colors of track images, the colors corresponding to the languages of the voices, respectively.

FIG. 18A shows a case in which the language of the voice is Japanese, and a track image is displayed in, for example, a blue color.

FIG. 18B shows a case in which the language of the voice is English, and a track image is displayed in, for example, a red color.

In this example, when the language of a voice is Japanese, a track image is displayed in blue color, and when the language of a voice is English, a track image is displayed in red color. However, this is merely an example, and needless to say, a track image may be displayed in other colors in accordance with the language of the voice.

As can be seen from the above description, the input display device according to this Embodiment 3 is configured to include the language determining unit 14 for performing the process of determining the language of the voice detected by the voice detecting unit 6, and outputting a result of the determination of the language, and the display control unit 15 displays the track image generated by the track image generating unit 12 on the display 29 in a color corresponding to the language shown by the determination result outputted from the language determining unit 14. As a result, there is provided an advantage of enabling the user to intuitively grasp in which language characters are displayed.

Embodiment 4

In the examples of above-mentioned Embodiments 1 to 3, only the character string is finally displayed on the display 29 as a result of deleting the track image after a track image and a character string are displayed is shown. In addition, an image of a picture, which is generated in accordance with a user's operation of drawing the picture, can be displayed on the display 29.

Figure 19:
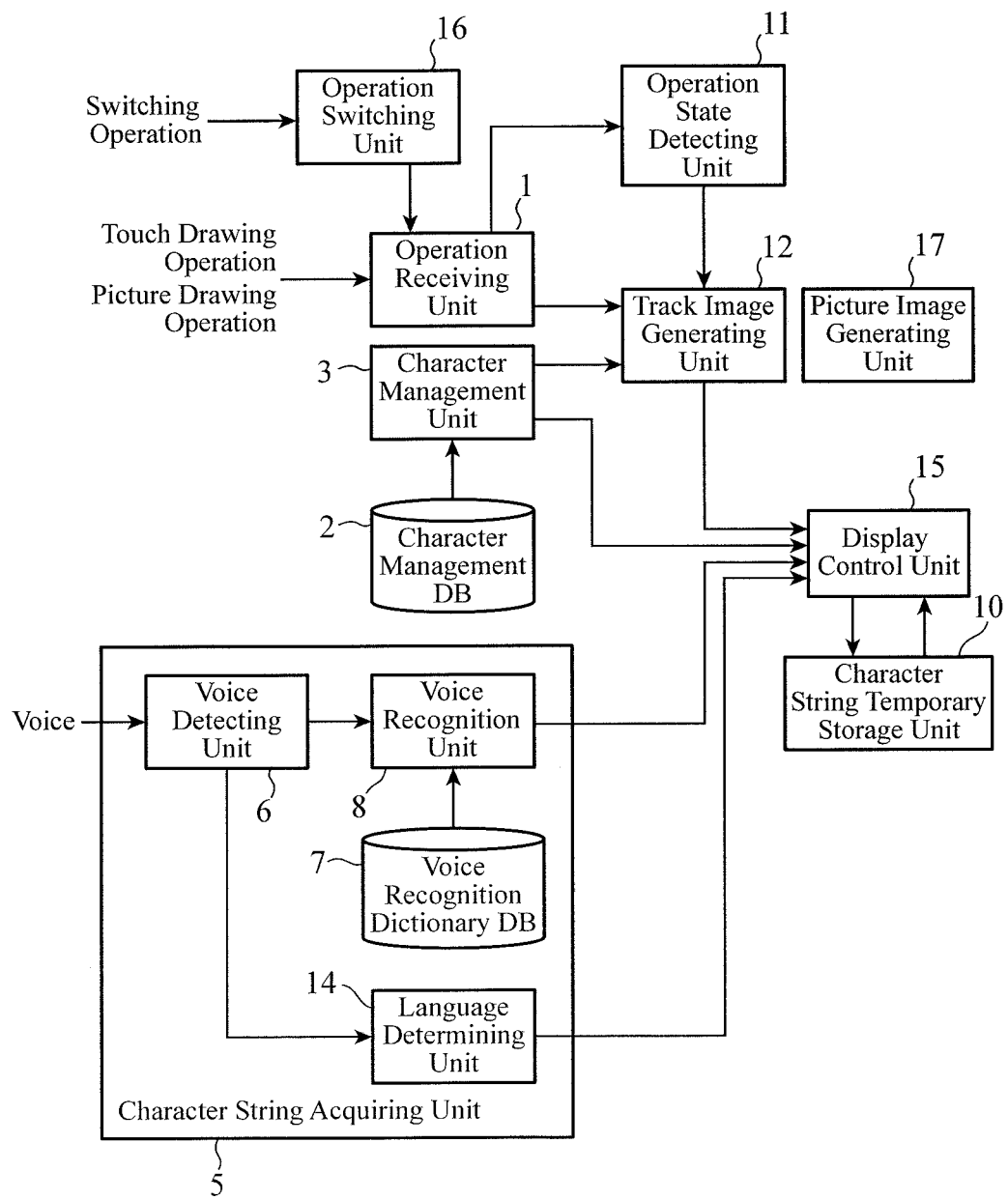
FIG. 19 is a block diagram showing an input display device according to Embodiment 4 of the present invention.
Figure 20:
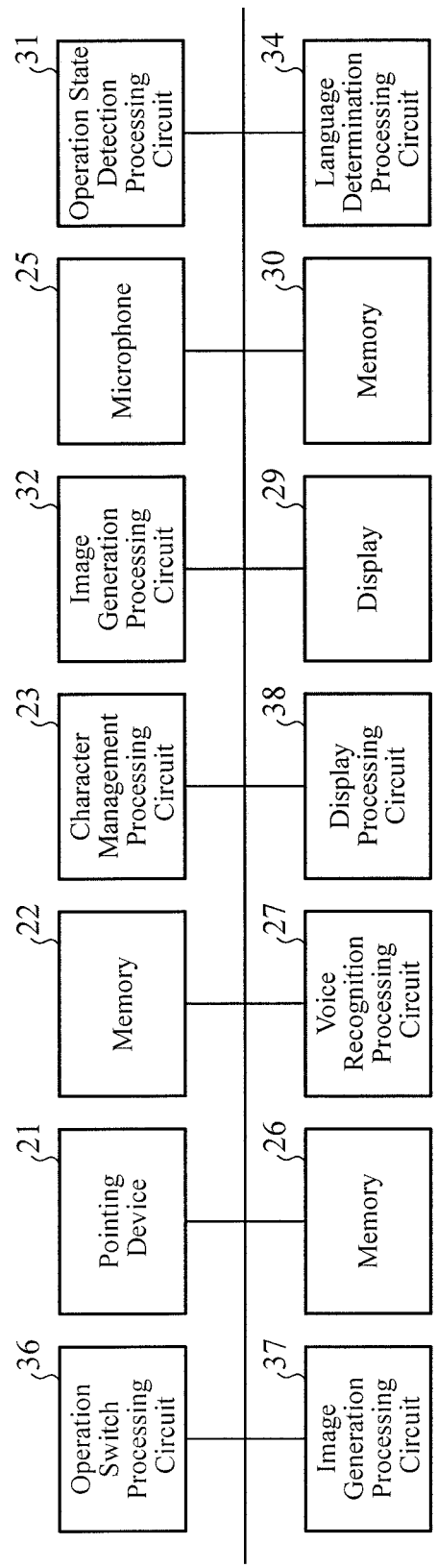
FIG. 20 is a hardware block diagram of the input display device according to Embodiment 4 of the present invention.

FIG. 19 is a block diagram showing an input display device according to Embodiment 4 of the present invention, and FIG. 20 is a hardware block diagram of the input display device according to Embodiment 4 of the present invention.

In FIGS. 19 and 20, the same reference numerals as those shown in FIGS. 15 and 16 denote the same or corresponding components, so that the explanation of the components will be omitted hereafter.

An operation switching unit 16 is implemented by an operation switch processing circuit 36 which is composed of, for example, a semiconductor integrated circuit implementing a CPU, a one chip microcomputer, or the like. When detecting a press and hold operation on a pointing device 21, as an operation of switching between operations each of which is to be received by an operation receiving unit 1, the operation switching unit 16 performs a process of switching between operations each of which is to be received by the operation receiving unit 1.

More specifically, in a case in which a current operation which is to be received by the operation receiving unit 1 is a touch drawing operation, when detecting a press and hold operation on the pointing device 21, the operation switching unit 16 performs the process of switching the operation which is to be received by the operation receiving unit 1 to a picture drawing operation for drawing a picture on a display 29. In contrast, in a case in which the current operation which is to be received by the operation receiving unit 1 is a picture drawing operation, when detecting a press and hold operation on the pointing device 21, the operation switching unit performs the process of switching the operation which is to be received by the operation receiving unit 1 to a touch drawing operation.

A picture image generating unit 17 is implemented by an image generation processing circuit 37 which is composed of, for example, a semiconductor integrated circuit implementing a GPU, a one chip microcomputer, or the like. When the operation after switching by the operation switching unit 16 is a picture drawing operation, the picture image generating unit 17 performs a process of generating an image of a picture in accordance with a picture drawing operation received by the operation receiving unit 1.

A display control unit 18 is implemented by a display processing circuit 38 which is composed of, for example, a semiconductor integrated circuit implementing a GPU, a one chip microcomputer, or the like. When the operation after switching by the operation switching unit 16 is a touch drawing operation, the display control unit 18 performs the same displaying process as that performed by the display control unit 15 shown in FIG. 15.

When the operation after switching by the operation switching unit 16 is a picture drawing operation, the display control unit 18 performs a process of displaying an image of the picture, the image being generated by the picture generating unit 17, on the display 29.

In the example shown in FIG. 19, it is assumed that each of the operation receiving unit 1, a character management DB 2, a character management unit 3, an operation state detecting unit 11, a track image generating unit 12, the operation switching unit 16, the picture image generating unit 17, a character string acquiring unit 5, the display control unit 18 and a character string temporary storage unit 10, which is a component of the input display device, is composed of hardware for dedicated use. As an alternative, the input display device may be composed of a computer.

In the case in which the input display device is composed of a computer, the character management DB 2, a voice recognition dictionary DB 7 and the character string temporary storage unit 10 are configured on a memory 41 of the computer, a program in which the details of the process performed by each of the operation receiving unit 1, the character management unit 3, the operation state detecting unit 11, the track image generating unit 12, the operation switching unit 16, the picture image generating unit 17, a voice detecting unit 6, a voice recognition unit 8, a language determining unit 14 and the display control unit 18 is described is stored in the memory 41, and a processor 42 is made to execute the program stored in the memory 41.

Figure 21:
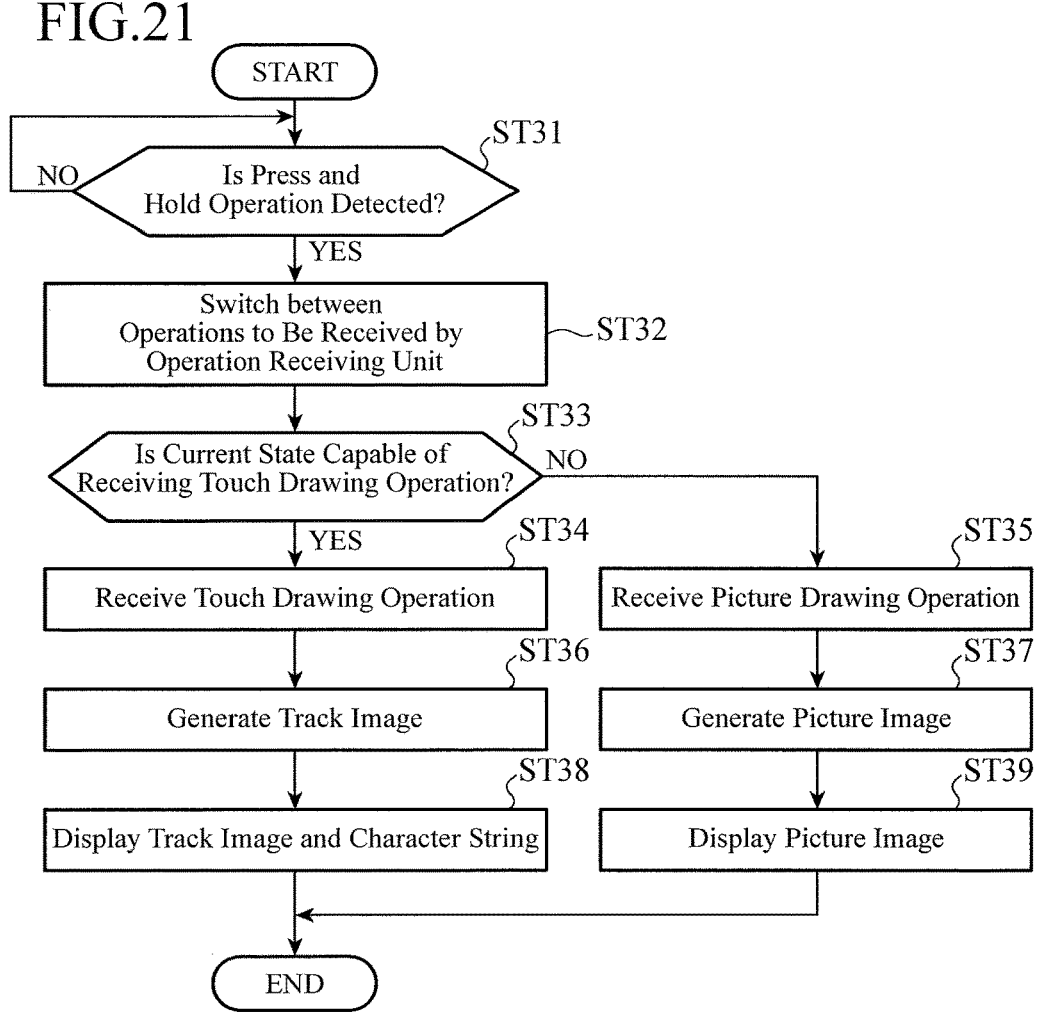
FIG. 21 is a flow chart showing processing in a case where switching between operations each of which is to be received by an operation receiving unit 1 is performed.

FIG. 21 is a flow chart showing processing at a time when the operation to be received by the operation receiving unit 1 is switched to another operation.

Next, operations will be explained.

When detecting a press and hold operation as an operation for switching between operations each of which is to be received by the operation receiving unit 1 (when Yes in step ST31 of FIG. 21), the operation switching unit 16 performs the process of switching between operations each of which is to be received by the operation receiving unit 1 (step ST32).

Figure 22:
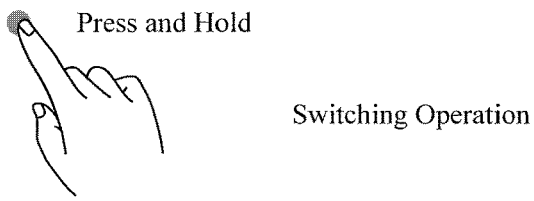
FIG. 22 is an explanatory diagram showing an example of an operation of switching between operations each of which is to be received by the operation receiving unit 1.

FIG. 22 is an explanatory diagram showing an example of the operation of switching between operations each of which is to be received by the operation receiving unit 1.

In FIG. 22, an example in which the operation of switching between operations each of which is to be received by the operation receiving unit 1 is a press and hold operation is shown. The press and hold operation is, for example, an operation of continuously touching the same position of a touch panel being a pointing device 21 with a user's finger for a preset time period or longer.

More specifically, when the current operation to be received by the operation receiving unit 1 is a touch drawing operation, and a press and hold operation on the pointing device 21 is detected, the operation switching unit 16 outputs a command to switch the operation to be received, from then on, by the operation receiving unit 1 to a picture drawing operation to the operation receiving unit 1.

In contrast, when the current operation to be received by the operation receiving unit 1 is a picture drawing operation, and a press and hold operation on the pointing device 21 is detected, the operation switching unit outputs a command to switch the operation to be received, from then on, by the operation receiving unit 1 to a touch drawing operation to the operation receiving unit 1.

The operation receiving unit 1 switches between operations each of which is to be received in accordance with the command outputted by the operation switching unit 16.

Namely, when the operation receiving unit 1 is in the state in which the operation to be received is switched to a touch drawing operation (when YES in step ST33), the operation receiving unit 1 receives a touch drawing operation and outputs information about the touch drawing operation to the track image generating unit 12 (step ST34), like those according to above-mentioned Embodiments 1 to 3.

Further, when the operation receiving unit 1 is in the state in which the operation to be received is switched to a picture drawing operation (when NO in step ST33), the operation receiving unit 1 receives a picture drawing operation and outputs information about the picture drawing operation to the picture image generating unit 17 (step ST35).

When the operation receiving unit 1 receives a touch drawing operation, the track image generating unit 12 generates a track image in accordance with information about the touch drawing operation (step ST36), like that according to Embodiment 2 described before.

When the operation receiving unit 1 receives a picture drawing operation, the picture generating unit 17 generates an image of a picture in accordance with information about the picture drawing operation (step ST37).

Figure 23:
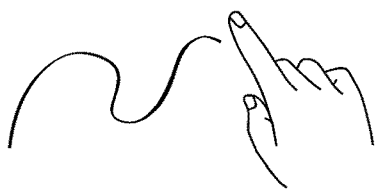
FIG. 23 is an explanatory diagram showing an example of an image of a picture which is generated in accordance with information about a picture drawing operation.

FIG. 23 is an explanatory diagram showing an example of the image of the picture which is generated in accordance with the information about the picture drawing operation.

Because the process of generating an image of a picture in accordance with information about a picture drawing operation is a known technique, a detailed explanation of the process will be omitted hereafter. The information about a picture drawing operation can include, as well as information about a function of drawing a line, information about a function of changing the thickness and the color of a line to be drawn, and information about an eraser function for erasing a line.

When the track image generating unit 12 generates a track image, the display control unit 18 performs a process of displaying both the track image and a character string outputted from the character string acquiring unit 5 on the display 29 (step ST38), like the display control unit 15 shown in FIG. 15.

Further, when the picture image generating unit 17 generates an image of a picture, the display control unit 18 displays the image of the picture on the display 29 (step ST39).

As can be seen from the above description, because the input display device according to this Embodiment 4 is configured in such away that the input display device includes the operation switching unit 16 for switching between operations each of which is to be received by the operation receiving unit 1, and the picture image generating unit 17 for, when an operation after switching by the operation switching unit 16 is a picture drawing operation, generating an image of a picture in accordance with a picture drawing operation received by the operation receiving unit 1. When the operation after switching by the operation switching unit 16 is a touch drawing operation, the display control unit 18 displays a track image and a character string while superimposing the character string on the track image, like the display control unit 15 shown in FIG. 15. On the other hand, when the operation after switching by the operation switching unit 16 is a picture drawing operation, the display control unit 18 displays the image of the picture generated by the picture image generating unit 17. As a result, there is provided an advantage of being able to display the image of the picture on the display 29 together with the character string.

In the example shown in this Embodiment 4, when an operation to be received by the operation receiving unit 1 is a touch drawing operation, and when a press and hold operation on the pointing device 21 is detected, the operation switching unit 16 switches the operation to be received by the operation receiving unit 1 to a picture drawing operation. On the other hand, when an operation to be received by the operation receiving unit 1 is a picture drawing operation, and when a press and hold operation on the pointing device 21 is detected, the operation switching unit 16 switches the operation to be received by the operation receiving unit 1 to a touch drawing operation.

However, the method of switching between operations each of which is to be received by the operation receiving unit 1 is not limited to this example, and a switching method shown below can also be used.

For example, a picture drawing operation is set, under normal conditions, as the operation to be received by the operation receiving unit 1, and, when a press and hold operation on the pointing device 21 is detected, the operation switching unit 16 outputs a command to switch the operation to be received by the operation receiving unit 1 to a touch drawing operation to the operation receiving unit 1, thereby enabling the operation receiving unit 1 to receive a touch drawing operation.

When a touch drawing operation is finished, the operation to be received by the operation receiving unit 1 is automatically returned to a picture drawing operation, and after that, when a press and hold operation on the pointing device 21 is detected, the operation switching unit 16 outputs a command to switch the operation to be received by the operation receiving unit 1 to a touch drawing operation to the operation receiving unit 1 again, thereby enabling the operation receiving unit 1 to receive a touch drawing operation.

In an example of this Embodiment 4, when a press and hold operation on the pointing device 21 is detected, the operation switching unit 16 switches between operations each of which is to be received by the operation receiving unit 1. Further, information showing whether the operation to be currently received by the operation receiving unit 1 is either a touch drawing operation or a picture drawing operation may be displayed on the display 29.

Note that, while the invention has been described in some embodiments, it is to be understood that any combination of two or more of the above-mentioned embodiments can be made, various changes can be made in any component of any one of the above-mentioned embodiments, and any component of any one of the above-mentioned embodiments can be omitted within the scope of the invention.

INDUSTRIAL APPLICABILITY

The input display device and the input display method according to the present invention are suitable for use in devices that, when displaying a character string showing a result of recognition of a voice on a display, have to display the character string in a layout flexibly set by the user.

REFERENCE SIGNS LIST

1 operation receiving unit, 2 character management DB, 3 character management unit, 4 track image generating unit, 5 character string acquiring unit, 6 voice detecting unit, 7 voice recognition dictionary DB, 8 voice recognition unit, 9 display control unit, 10 character string temporary storage unit, 11 operation state detecting unit, 12 track image generating unit, 13 display control unit, 14 language determining unit, 15 display control unit, 16 operation switching unit, 17 picture image generating unit, 18 display control unit, 21 pointing device, 22 memory, 23 character management processing circuit, 24 image generation processing circuit, 25 microphone, 26 memory, 27 voice recognition processing circuit, 28 display processing circuit, 29 display, 30 memory, 31 operation state detection processing circuit, 32 image generation processing circuit, 33 display processing circuit, 34 language determination processing circuit, 35 display processing circuit, 36 operation switch processing circuit, 37 image generation processing circuit, 38 display processing circuit, 41 memory, and 42 processor.

The invention claimed is:

1. An input display device for showing voice recognition results along a user defined track, the input display device comprising:
    a processor to execute a program; and
    a memory to store the program which, when executed by the processor, results in performance of steps comprising:
        receiving a track input by a receiving unit;
        generating a track image showing the track, the track image having a line width corresponding to a character height stored in the memory;
        acquiring a character string corresponding to a voice recognition result;
        displaying the generated track image on a display; and
        superimposing the acquired character string on the displayed track image,
    wherein when the character string is acquired in the acquiring before the receiving the track input, the displaying the character string is stood by, and when the track input is received in the receiving, the displaying the generated track image and the superimposing the acquired character string on the displayed track image are performed.

2. The input display device according to claim 1, wherein when the character string is acquired before the track image is generated, the displaying the character string is stood by, and after the track image is displayed, the displaying the character string is performed to be superimposed on the track image.

3. The input display device according to claim 1, wherein the track is a continuous change in a position of an object in contact with the receiving unit.

4. The input display device according to claim 1, the steps further comprising: deleting the track image after the displaying the character string to be superimposed on the track image.

5. The input display device according to claim 1, wherein in the displaying the character string, characters of the character string acquired in the acquiring is displayed sequentially in order starting with a first one of the characters and ending with a last one of the characters.

6. The input display device according to claim 1, the steps further comprising:
    detecting a state of the input of the track received in the receiving, and
    wherein in the generating, a track image having a line width corresponding to the state of the input of the track detected in the detecting is generated.

7. The input display device according to claim 6, wherein in the generating, when the state of the input of the track detected in the detecting changes in a middle of the input of the track, the track image whose line width changes in a middle of the track image is generated.

8. The input display device according to claim 1, the steps further comprising:
    acquiring a result of determination of a language of the voice when the acquiring the character string is performed, and
    in the displaying, the track image generated in a color corresponding to the language acquired by the acquiring the result of determination of the language is displayed.

9. The input display device according to claim 1, the steps further comprising:
    switching between operations each of which is to be received by the receiving unit;
    generating an image, when an operation after the switching is a drawing operation on the display, in accordance with a drawing operation received by the receiving unit; and
    when an operation after the switching is the input of the track, determining the track of a line inputted in the receiving to generate a track image showing the track, and wherein when an operation after the switching is the drawing operation, the image generated in the generating the image is displayed on the display, and when an operation after the switching is the input of the track, the track image generated in the generating the track image is displayed on the display.

10. The input display device according to claim 1, wherein the input display device further comprises a display on which an image is displayed.

11. An input display method for showing voice recognition results along a user defined track, the method comprising:
   receiving a track input;
   generating a track image showing the track, the track image having a line width corresponding to a character height stored in the memory;
   acquiring a character string corresponding to a voice recognition result;
   displaying the generated track image on a display; and
   superimposing the acquired character string on the displayed track image,
   wherein when the character string is acquired before the track input is received, the displaying of the character string is stood by, and when the track input is received, the generated track image is displayed and the acquired character string is superimposed on the displayed track image.

12. A non-transitory computer-readable medium comprising instructions that, when executed by a processor, cause the processor to perform the following method for showing voice recognition results along a user defined track:
   receiving a track input;
   generating a track image showing the track, the track image having a line width corresponding to a character height stored in the memory; and
   acquiring a character string corresponding to a voice recognition result;
   displaying the generated track image on a display; and
   superimposing the acquired character string on the displayed track image, wherein when the character string is acquired before the track input is received, the displaying of the character string is stood by, and when the track input is received, the generated track image is displayed and the acquired character string is superimposed on the displayed track image.

* * * * *